(12) United States Patent
Ichihashi et al.

(10) Patent No.: US 10,087,863 B2
(45) Date of Patent: Oct. 2, 2018

(54) INTERNAL COMBUSTION ENGINE CONTROL DEVICE

(71) Applicant: Keihin Corporation, Tokyo (JP)

(72) Inventors: Satoshi Ichihashi, Shioya-gun (JP); Tomomi Yonemaru, Shioya-gun (JP); Takashi Takanohashi, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 0 days.

(21) Appl. No.: 15/537,959

(22) PCT Filed: Dec. 11, 2015

(86) PCT No.: PCT/JP2015/084796
§ 371 (c)(1),
(2) Date: Jun. 20, 2017

(87) PCT Pub. No.: WO2016/104186
PCT Pub. Date: Jun. 30, 2016

(65) Prior Publication Data
US 2018/0038299 A1 Feb. 8, 2018

(30) Foreign Application Priority Data

Dec. 24, 2014 (JP) ................................ 2014-260394
Feb. 27, 2015 (JP) ................................ 2015-038161

(51) Int. Cl.
*F02D 41/14* (2006.01)
*F02P 5/152* (2006.01)
*F02B 61/02* (2006.01)

(52) U.S. Cl.
CPC .......... *F02D 41/1441* (2013.01); *F02P 5/152* (2013.01); *F02B 61/02* (2013.01); *F02D 2200/021* (2013.01); *F02D 2200/1002* (2013.01)

(58) Field of Classification Search
CPC .......... F02D 41/1441; F02D 2200/021; F02D 2200/1002; F02D 35/025; F02D 35/027;
(Continued)

(56) References Cited

U.S. PATENT DOCUMENTS 1,422,672 A * 7/1922 Coghlan ................ G01K 13/02
   136/231
3,923,552 A * 12/1975 Parris ...................... G01K 1/08
   136/227
(Continued)

FOREIGN PATENT DOCUMENTS

CN 102459862 A 5/2012
EP 09627871 A2 12/1999
(Continued)

OTHER PUBLICATIONS

Search Report dated Dec. 6, 2017, issued in counterpart European Application No. 15872755.2 (11 pages).
(Continued)

*Primary Examiner* — Thomas Moulis
*Assistant Examiner* — John Bailey
(74) *Attorney, Agent, or Firm* — Westerman, Hattori, Daniels & Adrian, LLP

(57) ABSTRACT

To provide an internal combustion engine control device (100) in which a control unit (107b) controls an operating condition of an internal combustion engine (1) based on a difference $\Delta TCC$ between a first temperature $TCC$ corresponding to the temperature of a first portion in a wall defining a combustion chamber of the internal combustion engine (1), and a second temperature $TE$ corresponding to the temperature of a second portion on an outer wall surface side than the first portion in the wall.

17 Claims, 9 Drawing Sheets

(58) Field of Classification Search
CPC ....... F02P 5/152; F02B 61/02; F01P 2025/33; F01P 2023/08; F01P 2025/08; F01P 2025/31; Y02T 10/12; F02M 25/03; F02M 26/47; G01M 15/048; F05D 2270/303

USPC .......... 123/435, 406.29, 673, 679, 691, 686, 123/406.21, 406.26–406.34, 123/406.37–406.39, 406.41–406.45; 73/35.01; 180/229; 374/144

See application file for complete search history.

(56) References Cited

U.S. PATENT DOCUMENTS

| | | | | |
|---|---|---|---|---|
| 4,556,327 | A * | 12/1985 | Kalil | G01K 3/06 374/115 |
| 5,201,840 | A * | 4/1993 | Sausner | F01P 11/14 123/41.15 |
| 5,642,717 | A * | 7/1997 | Gilman | F02B 77/089 123/481 |
| 5,669,337 | A * | 9/1997 | Drouillard | F01P 11/16 123/41.15 |
| 5,695,285 | A * | 12/1997 | Kuberka | G01K 1/16 136/230 |
| 5,697,706 | A * | 12/1997 | Ciaravino | G01K 3/14 374/166 |
| 5,890,360 | A * | 4/1999 | Sasaki | F02D 41/0057 60/276 |
| 6,026,679 | A * | 2/2000 | Holmes | F01P 11/16 123/41.15 |
| 6,267,100 | B1 * | 7/2001 | Torno | F02D 41/1497 123/406.29 |
| 6,293,246 | B1 * | 9/2001 | Tanahashi | F01L 1/34 123/305 |
| 6,354,264 | B1 * | 3/2002 | Iwakiri | F02D 35/023 123/305 |
| 6,405,122 | B1 * | 6/2002 | Yamaguchi | F02D 41/1404 701/102 |
| 7,669,583 | B2 * | 3/2010 | Moriya | F02D 35/023 123/406.22 |
| 8,006,545 | B2 * | 8/2011 | Adkins | G01K 7/021 73/114.01 |
| 8,019,528 | B2 * | 9/2011 | Catanese | F02D 35/023 123/406.29 |
| 8,244,447 | B2 * | 8/2012 | Christ | G01K 1/14 123/146.5 R |
| 9,222,840 | B1 * | 12/2015 | Shammoh | G01K 1/026 |
| 9,234,818 | B2 * | 1/2016 | Tanaka | F02P 5/152 |
| 9,416,738 | B2 * | 8/2016 | Suzuki | F02D 35/023 |
| 9,915,212 | B2 * | 3/2018 | Burger | F02D 41/0027 |
| 2002/0020393 | A1 * | 2/2002 | Ogawa | F02B 17/005 123/406.26 |
| 2008/0295590 | A1 * | 12/2008 | Sukegawa | G01F 1/688 73/204.26 |
| 2010/0079155 | A1 * | 4/2010 | Matsuoka | G01L 23/18 324/691 |
| 2011/0288749 | A1 * | 11/2011 | Santoso | F02D 35/023 701/105 |
| 2012/0090585 | A1 * | 4/2012 | Anzawa | F02D 35/027 123/568.12 |
| 2014/0060490 | A1 * | 3/2014 | Iwai | F02D 41/30 123/478 |
| 2015/0226144 | A1 * | 8/2015 | Sixel | F02D 41/0085 123/406.21 |
| 2015/0300278 | A1 * | 10/2015 | Badawy | F02D 41/1458 123/406.26 |
| 2016/0084179 | A1 * | 3/2016 | Holst | F02D 19/0642 123/406.45 |
| 2017/0051700 | A1 * | 2/2017 | Fulton | F02D 41/1497 |

FOREIGN PATENT DOCUMENTS

| | | |
|---|---|---|
| EP | 2 446 138 A1 | 5/2012 |
| JP | 63-1749 A | 1/1988 |
| JP | 4-81575 A | 3/1992 |
| JP | 11-343916 A | 12/1999 |
| JP | 2001-273436 A | 10/2001 |
| JP | 2004-11483 A | 1/2004 |
| JP | 2004-170309 A | 6/2004 |
| JP | 2004-353490 A | 12/2004 |
| JP | 2006-328962 A | 12/2006 |
| JP | 2008-231948 A | 10/2008 |
| JP | 2011-7061 A | 1/2011 |
| JP | 2012-219757 A | 11/2012 |
| WO | 2010/150066 A1 | 12/2010 |

OTHER PUBLICATIONS

International Search Report dated Jan. 19, 2016, issued in counterpart application No. PCT/JP2015/084796. (5 pages).

Notice of Reasons of Rejection dated Jul. 11, 2018, issued in counterpart Japanese Application No. 2016-566109, with English machine translation. (9 pages).

* cited by examiner

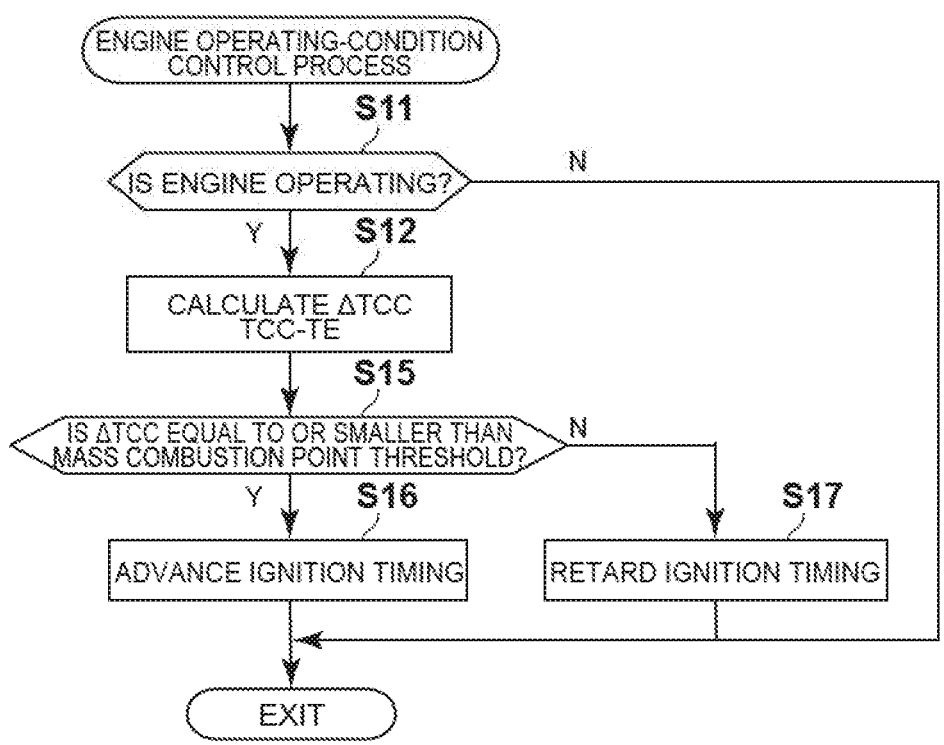

US 10,087,863 B2

INTERNAL COMBUSTION ENGINE CONTROL DEVICE

TECHNICAL FIELD

The present invention relates to an internal combustion engine control device, and more particularly relates to the internal combustion engine control device that is applied to an internal combustion engine of a vehicle such as a two-wheeled automobile.

BACKGROUND ART

In recent years, with respect to an internal combustion engine of a vehicle such as a two-wheeled automobile, there has been adopted an electronically controlled internal combustion engine control device that electronically controls an operating condition of an internal combustion engine, while causing fuel supply to the internal combustion engine, air supply, and ignition to an air-fuel mixture containing fuel and air to cooperate with each other by using a controller.

Specifically, the internal combustion engine control device has a configuration to calculate a fuel injection amount for realizing an appropriate air-fuel ratio in the internal combustion engine, based on an intake air mass with respect to the internal combustion engine acquired by using respective detection signals from sensors such as an air flow sensor, a throttle opening degree sensor, and an intake manifold negative pressure sensor, and a rotation speed of the internal combustion engine acquired by using a detection signal from a crank angle sensor. Further, the internal combustion engine control device has a configuration to perform fuel injection to the internal combustion engine with the calculated fuel injection amount and perform ignition of the air-fuel mixture containing the intake air and the injected fuel at a predetermined ignition timing (a predetermined timing of an ignition). At this time, in the internal combustion engine control device, a threshold limit value in the fuel injection amount and the ignition timing may be respectively set, taking into consideration characteristics such as MBT (Minimum advance for the Best Torque) and knock in the internal combustion engine. Further, among internal combustion engine control device s, there is one having a configuration in which adjustment of the fuel injection amount to the air-fuel mixture depending on a combustion state in a combustion chamber and adjustment of the ignition timing are respectively performed by using respective detection signals from sensors such as a cylinder internal pressure sensor, a knock sensor, and an ion current sensor.

Under such circumstances, Patent Document 1 relates to an engine control method, and has a configuration in which preignition that causes light-off before ignition due to an increase of the temperature in the cylinder is prevented by using a crank angle sensor, an oxygen concentration sensor, a temperature sensor, a throttle opening degree sensor, an intake pipe pressure sensor, a hot-wire intake air mass sensor, an intake air temperature sensor, an exhaust pipe temperature sensor, and a catalyst temperature sensor, and even if light-off occurs before ignition, appropriate processing is performed to prevent breakage of the engine.

PRIOR ART DOCUMENT

Patent Document

Patent Document 1: Japanese Patent Application Laid-open Publication No. H9-273436

SUMMARY OF THE INVENTION

Problem to be Solved by the Invention

However, according to studies made by the present inventors, in the configuration disclosed in Patent Document 1, various additional sensors such as an oxygen concentration sensor, an intake pipe pressure sensor, a hot-wire intake air mass sensor, an exhaust pipe temperature sensor, and a catalyst temperature sensor need to be provided, and thus the configuration becomes complicated and the entire cost of the vehicle tends to increase.

Further, according to the studies made by the present inventors, to accurately capture the combustion oscillation at the time of abnormal combustion such as knock, which is evaluated as having a frequency from 5 to 10 kHz, data sampling at a cycle of at least 100 µs is required. Therefore, high responsiveness of a sensor and high speed of a read circuit are required, and thus the configuration becomes further complicated and the entire cost of the vehicle tends to increase further.

That is, under present circumstances, it can be said that it has been desired to realize an internal combustion engine control device that can be preferably applied to vehicles such as a two-wheeled automobile in which light weight and small size are particularly desired and can detect a combustion state in a combustion chamber with a simple configuration to control an operating condition of an internal combustion engine depending on the combustion state.

The present invention has been achieved in view of the above problems, and an object of the present invention is to provide an internal combustion engine control device that can detect a combustion state in a combustion chamber with a simple configuration and control an operating condition of an internal combustion engine depending on the combustion state.

Means for Solving the Problem

In order to achieve the above object, a first aspect of the present invention is to provide an internal combustion engine control device comprising a control unit that controls at least one of supply of fuel, supply of air, and ignition of an air-fuel mixture including the fuel and the air to control an operating condition of an internal combustion engine, wherein the control unit controls the operating condition of the internal combustion engine based on a first temperature corresponding to a temperature of a first portion in a wall defining a combustion chamber of the internal combustion engine, and a second temperature corresponding to a temperature of a second portion on an outer wall surface side than the first portion in the wall.

According to a second aspect of the present invention, in addition to the first aspect, the control device derives a value based on the first temperature and the second temperature, and sets a predetermined threshold based on torque of the internal combustion engine, and controls the operating condition of the internal combustion engine based on the value and the predetermined threshold.

According to a third aspect of the present invention, in addition to the second aspect, the value is a difference or a ratio between the first temperature and the second temperature.

According to a fourth aspect of the present invention, in addition to the second and third aspects, the control unit executes control to advance or retard a timing of ignition of the internal combustion engine according to a magnitude relation between the value and the predetermined threshold, and the predetermined threshold is a threshold corresponding to a knocking level of the internal combustion engine.

According to a fifth aspect of the present invention, there is provided an internal combustion engine control device comprising a control unit that controls at least one of supply of fuel, supply of air, and ignition of an air-fuel mixture including the fuel and the air to control an operating condition of an internal combustion engine, wherein the control unit derives a value based on a first temperature corresponding to a temperature of a first portion in a wall defining a combustion chamber of the internal combustion engine, and a second temperature corresponding to a temperature of a second portion on an outer wall surface side than the first portion in the wall, sets a predetermined threshold corresponding to a timing of the ignition at which torque of the internal combustion engine becomes maximum, and controls the operating condition of the internal combustion engine based on the value and the predetermined threshold.

According to a sixth aspect of the present invention, in addition to the fifth aspect, the value is a difference or a ratio between the first temperature and the second temperature.

According to a seventh aspect of the present invention, in addition to the fifth and sixth aspects, the control unit executes control to advance or retard a timing of ignition of the internal combustion engine according to a magnitude relation between the value and the predetermined threshold.

According to an eighth aspect of the present invention, there is provided an internal combustion engine control device comprising a control unit that controls at least one of supply of fuel, supply of air, and ignition of an air-fuel mixture including the fuel and the air to control an operating condition of an internal combustion engine, wherein the control unit derives a value based on a first temperature corresponding to a temperature of a first portion in a wall defining a combustion chamber of the internal combustion engine, and a second temperature corresponding to a temperature of a second portion on an outer wall surface side than the first portion in the wall, sets a predetermined threshold corresponding to a predetermined mass combustion crank angle of the internal combustion engine, and controls the operating condition of the internal combustion engine based on the value and the predetermined threshold.

According to a ninth aspect of the present invention, in addition to the eighth aspect, the value is a difference or a ratio between the first temperature and the second temperature.

According to a tenth aspect of the present invention, in addition to the eighth and ninth aspects, the control unit executes control to advance or retard a timing of ignition of the internal combustion engine according to a magnitude relation between the value and the predetermined threshold.

According to an eleventh aspect of the present invention, there is provided an internal combustion engine control device comprising a control unit that controls at least one of supply of fuel, supply of air, and ignition of an air-fuel mixture including the fuel and the air to control an operating condition of an internal combustion engine, wherein the control unit controls the operating condition of the internal combustion engine based on a first temperature corresponding to a temperature of a first portion in a wall defining a combustion chamber of the internal combustion engine, and a second temperature corresponding to a temperature of a second portion on an outer wall surface side than the first portion in the wall, and the first temperature is detected by a temperature sensor attached to an attachment portion of the internal combustion engine on an intake valve side, as the temperature of the wall on the intake valve side of the internal combustion engine.

According to a twelfth aspect of the present invention, in addition to the eleventh aspect, a first temperature sensor element of the temperature sensor is attached to the internal combustion engine so as to be exposed to the combustion chamber, via a recess that is depressed from an inner wall surface of a wall defining a combustion chamber of the internal combustion engine, and opens to the inner wall surface.

According to a thirteenth aspect of the present invention, in addition to the twelfth aspect, the temperature sensor is a single temperature sensor in which the first temperature sensor element and a second temperature sensor element share a case, and the control unit controls an operating condition of the internal combustion engine by using the first temperature detected by the first temperature sensor element and the second temperature detected by the second temperature sensor element.

According to a fourteenth aspect of the present invention, there is provided an internal combustion engine control device comprising a control unit that controls at least one of supply of fuel, supply of air, and ignition of an air-fuel mixture including the fuel and the air to control an operating condition of an internal combustion engine, wherein the control unit controls the operating condition of the internal combustion engine based on a difference between a first temperature corresponding to a wall surface temperature of a combustion chamber of the internal combustion engine, and a second temperature corresponding to a representative temperature of the internal combustion engine.

According to a fifteenth aspect of the present invention, in addition to the fourteenth aspect, the first temperature is detected by a temperature sensor attached to an attachment portion of the internal combustion engine on an intake valve side, as the wall surface temperature of the combustion chamber of the internal combustion engine on the intake valve side.

According to a sixteenth aspect of the present invention, in addition to the fourteenth and fifteenth aspects, the control unit controls a timing of the ignition of the air-fuel mixture based on the difference between the first temperature and the second temperature, to control the operating condition of the internal combustion engine.

According to a seventeenth aspect of the present invention, in addition to the sixteenth aspect, the control unit controls to advance or retard the timing of the ignition according to a magnitude relation between the difference, between the first temperature and the second temperature, and a predetermined threshold, and the predetermined threshold is set to include a first threshold corresponding to a knocking level of the internal combustion engine.

According to an eighteenth aspect of the present invention, in addition to the seventeenth aspect, the predetermined threshold is set to further include a second threshold corresponding to the timing of the ignition at which torque of the internal combustion engine becomes maximum.

According to a nineteenth aspect of the present invention, in addition to the eighteenth aspect, the predetermined threshold is set to further include a third threshold corresponding to a predetermined mass combustion crank angle of the internal combustion engine.

According to a twentieth aspect of the present invention, there is provided an internal combustion engine control device comprising a control unit that controls an operating condition of an internal combustion engine of a vehicle equipped with the internal combustion engine and a temperature sensor that detects temperature information of the internal combustion engine, by using a temperature of the internal combustion engine calculated based on the temperature information, wherein the control unit controls the operating condition of the internal combustion engine by using a temperature of a combustion chamber calculated based on temperature information of the combustion chamber detected by a first temperature sensor element of the temperature sensor attached to the internal combustion engine so as to be exposed to the combustion chamber, via a recess that is depressed from an inner wall surface of a wall defining the combustion chamber of the internal combustion engine, and opens to the inner wall surface.

Effect of the Invention

According to the internal combustion engine control device of the first aspect of the present invention described above, the control unit controls the operating condition of the internal combustion engine based on the first temperature corresponding to the temperature of the first portion in the wall defining the combustion chamber of the internal combustion engine, and the second temperature corresponding to the temperature of the second portion on the outer wall surface side than the first portion in the wall. Accordingly, the combustion state in the combustion chamber can be detected and the operating condition of the internal combustion engine can be controlled according to the combustion state with a simple configuration. Particularly, the first temperature corresponding to the temperature of the first portion to which flames generated by light-off of the air-fuel mixture in the combustion chamber hardly propagate and the second temperature corresponding to the temperature of the second portion can be used as appropriate indices indicating a good or poor combustion state in the combustion chamber. Therefore, even in a transient temperature state such as during a warm-up operation of the internal combustion engine or in a low temperature state caused by operating the internal combustion engine with a relatively low load, the combustion state in the combustion chamber can be ascertained accurately to control the operating condition of the internal combustion engine. Further, by appropriately controlling the operating condition of the internal combustion engine, a fuel consumption rate of the internal combustion engine can be improved. In the conventional internal combustion engine, a threshold of an ignition timing corresponding to occurrence of knock is set to be large on a retarded side, taking an individual difference into consideration, and thus there is still room for achieving high efficiency. However, according to the internal combustion engine control device of the first aspect of the present invention, it is not necessary to take the individual difference of the internal combustion engine into consideration, and the threshold of the ignition timing can be set to be further on an advanced side, thereby enabling to achieve higher efficiency of the internal combustion engine. Particularly, because cooling capacity of the internal combustion engine can be taken into consideration based on the first temperature and the second temperature, for example, if the cooling capacity is sufficient, the ignition timing can be set to be further on the advanced side to achieve higher efficiency of the internal combustion engine. Further, in the knock sensor, when considering that as the rotation speed of the internal combustion engine of a vehicle increases, judgment of occurrence of knock tends to be difficult due to oscillations caused by various factors of the vehicle, the occurrence of knock can be suppressed appropriately by detecting the first temperature and the second temperature, instead of detecting oscillations by the knock sensor.

According to the internal combustion engine control device of the second aspect of the present invention, the control unit derives the value based on the first temperature and the second temperature, and sets the predetermined threshold based on the torque of the internal combustion engine, to control the operating condition of the internal combustion engine based on the value and the predetermined threshold. Accordingly, the operating condition of the internal combustion engine can be controlled appropriately based on the value and the predetermined threshold.

According to the internal combustion engine control device of the third aspect of the present invention, the value is a difference or a ratio between the first temperature and the second temperature. Accordingly, the operating condition of the internal combustion engine can be controlled appropriately based on the difference or the ratio between the first temperature and the second temperature, and the predetermined threshold.

According to the internal combustion engine control device of the fourth aspect of the present invention, the control unit executes control to advance or retard the timing of ignition of the internal combustion engine according to the magnitude relation between the value and the predetermined threshold, and the predetermined threshold is a threshold corresponding to the knocking level of the internal combustion engine. Accordingly, the operating condition of the internal combustion engine can be controlled accurately so as to suppress occurrence of knock, while controlling the ignition timing accurately.

According to the internal combustion engine control device of the fifth aspect of the present invention, the control unit derives the value based on the first temperature corresponding to the temperature of the first portion in the wall defining the combustion chamber of the internal combustion engine, and the second temperature corresponding to the temperature of the second portion on the outer wall surface side than the first portion in the wall, sets the predetermined threshold corresponding to the timing of ignition at which torque of the internal combustion engine becomes maximum, and controls the operating condition of the internal combustion engine based on the value and the predetermined threshold. Accordingly, the combustion state in the combustion chamber can be detected and the operating condition of the internal combustion engine can be controlled according to the combustion state, with a simple configuration. Particularly, the first temperature corresponding to the temperature of the first portion to which flames generated by light-off of the air-fuel mixture in the combustion chamber hardly propagate and the second temperature corresponding to the temperature of the second portion can be used as appropriate indices indicating a good or poor combustion state in the combustion chamber. Therefore, even in a transient temperature state such as during a warm-up operation of the internal combustion engine or in a low temperature state caused by operating the internal combustion engine with a relatively low load, the combustion state in the combustion chamber can be ascertained accurately to control the operating condition of the internal combustion engine. Further, by appropriately controlling the operating condition of the internal combustion engine, a fuel consumption rate of the internal combustion engine can be improved. In the conventional internal combustion engine, the threshold of the ignition timing corresponding to occurrence of knock is set to be large on the retarded side, taking the individual difference into consideration, and thus there is still room for achieving high efficiency. However, according to the internal combustion engine control device of the fifth aspect of the present invention, it is not necessary to take the individual difference of the internal combustion engine into consideration, and the threshold of the ignition timing can be set to be further on the advanced side, thereby enabling to achieve higher efficiency of the internal combustion engine. Particularly, because the cooling capacity of the internal combustion engine can be taken into consideration based on the first temperature and the second temperature, for example, if the cooling capacity is sufficient, the ignition timing can be set to the advanced side to achieve higher efficiency of the internal combustion engine. Further, the operating condition of the internal combustion engine can be controlled accurately so as to generate maximum torque, while controlling the ignition timing accurately. Further, in the knock sensor, when considering that as the rotation speed of the internal combustion engine of a vehicle increases, judgment of occurrence of knock tends to be difficult due to oscillations caused by various factors of the vehicle, the occurrence of knock can be suppressed appropriately by detecting the first temperature and the second temperature, instead of detecting oscillations by the knock sensor.

According to the internal combustion engine control device of the sixth aspect of the present invention, the value is a difference or a ratio between the first temperature and the second temperature. Accordingly, the operating condition of the internal combustion engine can be controlled appropriately based on the difference or the ratio between the first temperature and the second temperature, and the predetermined threshold.

According to the internal combustion engine control device of the seventh aspect of the present invention, the control unit executes control to advance or retard the timing of ignition of the internal combustion engine according to the magnitude relation between the value and the predetermined threshold. Accordingly, the operating condition of the internal combustion engine can be controlled accurately, while controlling the ignition timing accurately.

According to the internal combustion engine control device of the eighth aspect of the present invention, the control unit derives a value based on the first temperature corresponding to the temperature of the first portion in the wall defining the combustion chamber of the internal combustion engine, and the second temperature corresponding to the temperature of the second portion on the outer wall surface side than the first portion in the wall, sets the predetermined threshold corresponding to the predetermined mass combustion crank angle of the internal combustion engine, and controls the operating condition of the internal combustion engine based on the value and the predetermined threshold. Accordingly, the combustion state in the combustion chamber can be detected and the operating condition of the internal combustion engine can be controlled according to the combustion state, with a simple configuration. Particularly, the first temperature corresponding to the temperature of the first portion to which flames generated by light-off of the air-fuel mixture in the combustion chamber hardly propagate and the second temperature corresponding to the temperature of the second portion can be used as appropriate indices indicating a good or poor combustion state in the combustion chamber. Therefore, even in a transient temperature state such as during a warm-up operation of the internal combustion engine or in a low temperature state caused by operating the internal combustion engine with a relatively low load, the combustion state in the combustion chamber can be ascertained accurately to control the operating condition of the internal combustion engine. Further, by appropriately controlling the operating condition of the internal combustion engine, the fuel consumption rate of the internal combustion engine can be improved. In the conventional internal combustion engine, the threshold of the ignition timing corresponding to occurrence of knock is set to be large on the retarded side, taking the individual difference into consideration, and thus there is still room for achieving high efficiency. However, according to the internal combustion engine control device of the eighth aspect of the present invention, it is not necessary to take the individual difference of the internal combustion engine into consideration, and the threshold of the ignition timing can be set to be further on the advanced side, thereby enabling to achieve higher efficiency of the internal combustion engine. Particularly, because the cooling capacity of the internal combustion engine can be taken into consideration based on the first temperature and the second temperature, for example, if the cooling capacity is sufficient, the ignition timing can be set to the advanced side to achieve higher efficiency of the internal combustion engine. Further, the operating condition of the internal combustion engine can be controlled more accurately, while controlling the ignition timing accurately corresponding to the predetermined mass combustion crank angle. Further, in the knock sensor, when considering that as the rotation speed of the internal combustion engine of a vehicle increases, judgment of occurrence of knock tends to be difficult due to oscillations caused by various factors of the vehicle, the occurrence of knock can be suppressed appropriately by detecting the first temperature and the second temperature, instead of detecting oscillations by the knock sensor.

According to the internal combustion engine control device of the ninth aspect of the present invention, the value is a difference or a ratio between the first temperature and the second temperature. Accordingly, the operating condition of the internal combustion engine can be controlled appropriately based on the difference or the ratio between the first temperature and the second temperature, and the predetermined threshold.

According to the internal combustion engine control device of the tenth aspect of the present invention, the control unit executes control to advance or retard the timing of ignition of the internal combustion engine according to the magnitude relation between the value and the predetermined threshold. Accordingly, the operating condition of the internal combustion engine can be accurately controlled, while controlling the ignition timing accurately.

According to the internal combustion engine control device of the eleventh aspect of the present invention, the control unit controls the operating condition of the internal combustion engine based on the first temperature corresponding to the temperature of the first portion in the wall defining the combustion chamber of the internal combustion engine, and the second temperature corresponding to the temperature of the second portion on the outer wall surface side than the first portion in the wall, and the first temperature is detected by the temperature sensor attached to the attachment portion of the internal combustion engine on the intake valve side, as the temperature of the wall on the intake valve side of the internal combustion engine. Accordingly, the combustion state in the combustion chamber can be detected and the operating condition of the internal combustion engine can be controlled according to the combustion state, with a simple configuration. Particularly, the first temperature corresponding to the temperature of the first portion to which flames generated by light-off of the air-fuel mixture in the combustion chamber hardly propagate and the second temperature corresponding to the temperature of the second portion can be used as appropriate indices indicating a good or poor combustion state in the combustion chamber. Therefore, even in a transient temperature state such as during a warm-up operation of the internal combustion engine or in a low temperature state caused by operating the internal combustion engine with a relatively low load, the combustion state in the combustion chamber can be ascertained accurately to control the operating condition of the internal combustion engine. Further, by appropriately controlling the operating condition of the internal combustion engine, the fuel consumption rate of the internal combustion engine can be improved. In the conventional internal combustion engine, the threshold of the ignition timing corresponding to occurrence of knock is set to be large on the retarded side, taking the individual difference into consideration, and thus there is still room for achieving high efficiency. However, according to the internal combustion engine control device of the eleventh aspect of the present invention, it is not necessary to take the individual difference of the internal combustion engine into consideration, and the threshold of the ignition timing can be set to be further on the advanced side, thereby enabling to achieve higher efficiency of the internal combustion engine. Particularly, because the cooling capacity of the internal combustion engine can be taken into consideration based on the first temperature and the second temperature, for example, if the cooling capacity is sufficient, the ignition timing can be set to the advanced side to achieve higher efficiency of the internal combustion engine. As the first temperature, the temperature of the wall of the internal combustion engine on the intake valve side, where such a tendency that the flames generated by light-off of the air-fuel mixture in the combustion chamber hardly propagate appears notably, can be used. By using the first temperature, the combustion state in the combustion chamber can be detected reliably and the operating condition of the internal combustion engine can be controlled according to the combustion state. Further, in the knock sensor, when considering that as the rotation speed of the internal combustion engine of a vehicle increases, judgment of occurrence of knock tends to be difficult due to oscillations caused by various factors of the vehicle, the occurrence of knock can be suppressed appropriately by detecting the first temperature and the second temperature, instead of detecting oscillations by the knock sensor.

According to the internal combustion engine control device of the twelfth aspect of the present invention, the first temperature sensor element of the temperature sensor is attached to the internal combustion engine so as to be exposed to the combustion chamber, via the recess that is depressed from the inner wall surface of the wall defining the combustion chamber of the internal combustion engine, and opens to the inner wall surface. Accordingly, the first temperature is detected by the first temperature sensor element and the operating condition of the internal combustion engine can be controlled according to the detected temperature with a simple configuration. Particularly, by arranging the first temperature sensor element, in a case of the temperature sensor so as to correspond to the recess that opens to the inner wall surface of a cylinder head or a cylinder block defining the combustion chamber and is depressed therefrom, the first temperature can be directly detected, while absorbing an impact received from a combustion flow. Further, by using the first temperature, the operating condition of the internal combustion engine can be controlled, while accurately ascertaining the combustion state in the combustion chamber.

According to the internal combustion engine control device of the thirteenth aspect of the present invention, the temperature sensor is a single temperature sensor in which the first temperature sensor element and the second temperature sensor element share the case, and the control unit controls the operating condition of the internal combustion engine by using the first temperature detected by the first temperature sensor element and the second temperature detected by the second temperature sensor element. Accordingly, the first temperature and the second temperature can be detected, while simplifying the configuration of the temperature sensor.

According to the internal combustion engine control device of the fourteenth aspect of the present invention, the control unit controls the operating condition of the internal combustion engine based on a difference between the first temperature corresponding to the wall surface temperature of the combustion chamber of the internal combustion engine, and the second temperature corresponding to the representative temperature of the internal combustion engine. Accordingly, the combustion state in the combustion chamber can be detected and the operating condition of the internal combustion engine can be controlled according to the combustion state with a simple configuration. Particularly, the difference between the wall surface temperature of the combustion chamber, to which flames generated by light-off of the air-fuel mixture in the combustion chamber hardly propagate, and the internal combustion engine representative temperature representatively indicating the temperature of the cylinder block including the combustion chamber as the temperature of the internal combustion engine can be used as appropriate indices indicating a good or poor combustion state in the combustion chamber. Therefore, even in a transient temperature state such as during a warm-up operation of the internal combustion engine or in a low temperature state caused by operating the internal combustion engine with a relatively low load, the combustion state in the combustion chamber can be ascertained accurately to control the operating condition of the internal combustion engine. Further, by appropriately controlling the operating condition of the internal combustion engine, the fuel consumption rate of the internal combustion engine can be improved.

According to the internal combustion engine control device of the fifteenth aspect of the present invention, the first temperature is detected by the temperature sensor attached to the attachment portion of the internal combustion engine on the intake valve side, as the wall surface temperature of the combustion chamber of the internal combustion engine on the intake valve side. Accordingly, as the first temperature, the wall surface temperature of the combustion chamber of the internal combustion engine on the intake valve side, in which such a tendency that the flames generated by light-off of the air-fuel mixture in the combustion chamber hardly propagate appears notably, can be used. By using the first temperature, the combustion state in the combustion chamber can be detected reliably and the operating condition of the internal combustion engine can be controlled according to the combustion state.

According to the internal combustion engine control device of the sixteenth aspect of the present invention, the control unit controls the timing of ignition of the air-fuel mixture based on the difference between the first temperature and the second temperature, to control the operating condition of the internal combustion engine. Accordingly, the operating condition of the internal combustion engine can be controlled appropriately, while controlling the ignition timing appropriately.

According to the internal combustion engine control device of the seventeenth aspect of the present invention, the control unit controls to advance or retard the timing of ignition according to the magnitude relation between the difference, between the first temperature and the second temperature, and the predetermined threshold, and the predetermined threshold is set to include the first threshold corresponding to the knocking level of the internal combustion engine. Accordingly, the operating condition of the internal combustion engine can be controlled accurately so as to suppress occurrence of knock, while controlling the ignition timing accurately.

According to the internal combustion engine control device of the eighteenth aspect of the present invention, the predetermined threshold is set to further include the second threshold corresponding to the ignition timing at which torque of the internal combustion engine becomes maximum. Accordingly, the operating condition of the internal combustion engine can be controlled accurately so as to generate maximum torque, while controlling the ignition timing accurately.

According to the internal combustion engine control device of the nineteenth aspect of the present invention, the predetermined threshold is set to further include the third threshold corresponding to the predetermined mass combustion crank angle of the internal combustion engine. Accordingly, the operating condition of the internal combustion engine can be controlled more accurately, while controlling the ignition timing more accurately corresponding to the predetermined mass combustion crank angle.

According to the internal combustion engine control device of the twentieth aspect of the present invention, the control unit controls the operating condition of the internal combustion engine by using the temperature of the combustion chamber calculated based on the temperature information of the combustion chamber detected by the first temperature sensor element of the temperature sensor attached to the internal combustion engine so as to be exposed to the combustion chamber, via the recess that is depressed from the inner wall surface of the wall defining the combustion chamber of the internal combustion engine, and opens to the inner wall surface. Accordingly, the temperature and the like of the combustion chamber of the internal combustion engine can be detected and the operating condition of the internal combustion engine can be controlled according to the detected temperature with a simple configuration. Particularly, by arranging the first temperature sensor element in the case of the temperature sensor so as to correspond to the recess that opens to the inner wall surface of the cylinder head or the cylinder block defining the combustion chamber and that is depressed therefrom, the temperature of the combustion chamber can be directly detected, while absorbing an impact received from a combustion flow. Further, by using the temperature of the combustion chamber, the operating condition of the internal combustion engine can be controlled, while accurately ascertaining the combustion state in the combustion chamber.

BRIEF DESCRIPTION OF THE DRAWINGS

FIG. 10 is a flowchart indicating a flow of an internal combustion engine operating-condition control process in still another modification of the present embodiment.

EMBODIMENT FOR CARRYING OUT THE INVENTION

Embodiments of an internal combustion engine control device according to the present invention will be explained below in detail with reference to the accompanying drawings.

[Configuration of Internal Combustion Engine]

A configuration of an internal combustion engine, to which an internal combustion engine control device according to the present embodiment is applied, is described with reference to FIG. 1.

Figure 1:
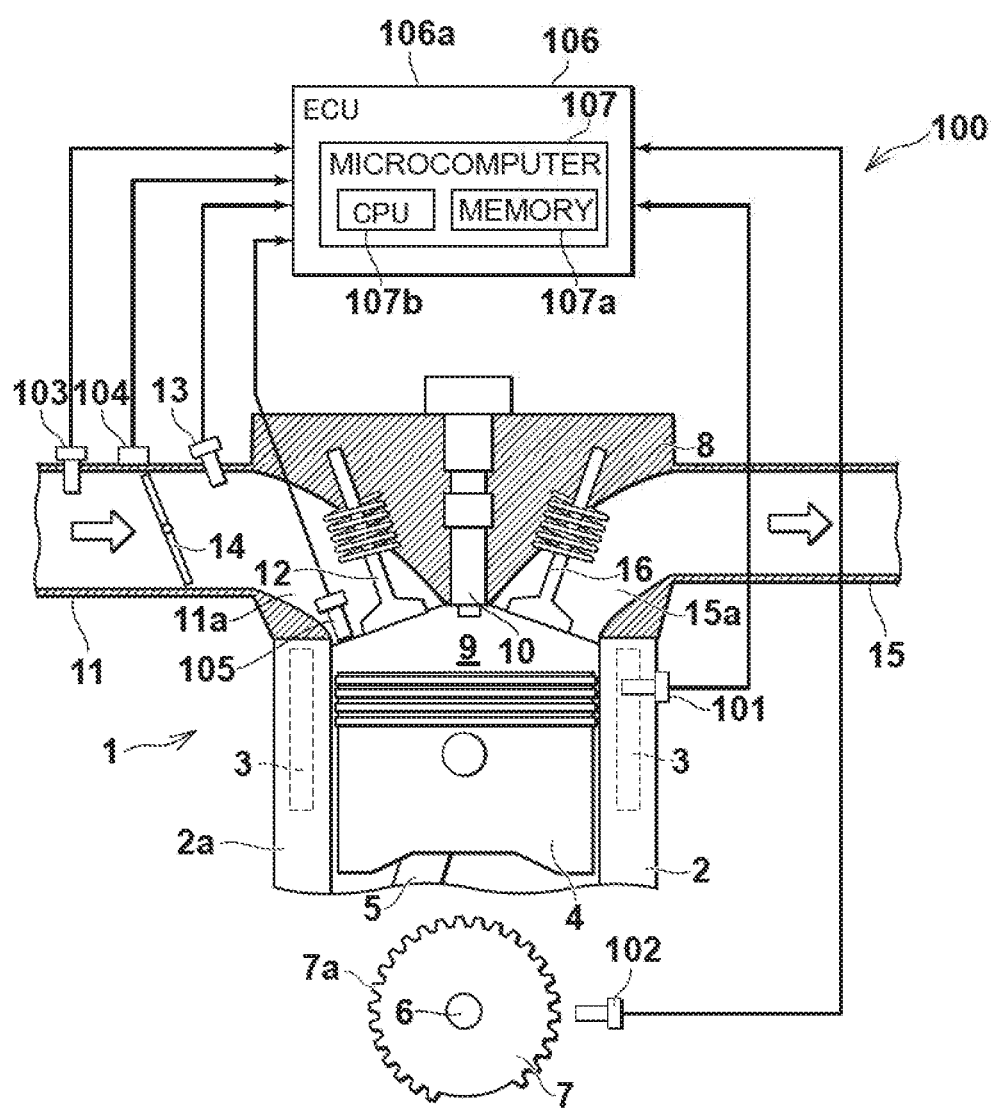
FIG. 1 is a schematic diagram showing configurations of an internal combustion engine and an internal combustion engine control device applied thereto according to an embodiment of the present invention.

FIG. 1 is a schematic diagram showing configurations of the internal combustion engine and the internal combustion engine control device applied thereto according to the present embodiment.

As shown in FIG. 1, an internal combustion engine 1 is mounted on a vehicle such as a two-wheeled automobile (not shown), and includes a cylinder block 2 having one or a plurality of cylinders 2a. A coolant passage 3, in which coolant to cool the cylinder block 2 circulates, is formed in a side wall of a portion corresponding to the cylinder 2a of the cylinder block 2. In FIG. 1, an example in which the number of the cylinder 2a is only one is shown for convenience sake.

A piston 4 is arranged in the cylinder 2a. The piston 4 is coupled to a crankshaft 6 via a conrod 5. A reluctor 7 that rotates coaxially with the crankshaft 6 is provided to the crankshaft 6. A plurality of teeth 7a arranged in a juxtaposed manner with a predetermined pattern in a circumferential direction of the reluctor 7 are provided in a standing manner on an outer periphery of the reluctor 7.

A cylinder head 8 is assembled to an upper part of the cylinder block 2. An inner wall surface of the cylinder block 2, an upper surface of the piston 4, and an inner wall surface of the cylinder head 8 define a combustion chamber 9 of the cylinder 2a in cooperation with each other.

A spark plug 10 that ignites an air-fuel mixture including fuel and air in the combustion chamber 9 is provided in the cylinder head 8. The number of the spark plugs 10 with respect to the respective combustion chambers 9 can be more than one.

An intake pipe 11 communicating with the combustion chamber 9 correspondingly is assembled to the cylinder head 8. An intake passage 11a for causing the combustion chamber 9 and the intake pipe 11 to communicate with each other correspondingly is formed in the cylinder head 8. An intake valve 12 is provided in a corresponding connection portion between the combustion chamber 9 and the intake passage 11a. The intake pipe 11 can be a manifold corresponding to the number of the cylinders 2a, and the number of the intake passages 11a becomes equal to the number of the cylinders 2a. The number of the intake valves 12 with respect to the respective combustion chambers 9 can be more than one.

An injector 13 that injects fuel into the intake pipe 11 is provided on the intake pipe 11. A throttle valve 14 is provided to the intake pipe 11 on an upstream side of the injector 13. The throttle valve 14 is a constituent part of a throttle device (not shown), and a body part of the throttle device is assembled to the intake pipe 11. The injector 13 can directly inject fuel to the corresponding combustion chamber 9. The number of the injectors 13 and the throttle valves 14 can be more than one.

An exhaust pipe 15 communicating with the combustion chamber 9 correspondingly is assembled to the cylinder head 8. An exhaust passage 15a for causing the combustion chamber 9 and the exhaust pipe 15 to communicate with each other correspondingly is formed in the cylinder head 8. An exhaust valve 16 is provided in a corresponding connection portion between the combustion chamber 9 and the exhaust passage 15a. The exhaust pipe 15 can be a manifold corresponding to the number of the cylinders 2a, and the number of the exhaust passages 15a becomes equal to the number of the cylinders 2a and the number of the exhaust pipes 15. The number of the exhaust valves 16 with respect to the respective combustion chambers 9 can be more than one.

[Configuration of Internal Combustion Engine Control Device]

The configuration of the internal combustion engine control device according to the present embodiment is described next with reference to FIG. 1.

As shown in FIG. 1, an internal combustion engine control device 100 according to the present embodiment includes a water temperature sensor 101, a crank angle sensor 102, an intake temperature sensor 103, a throttle opening degree sensor 104, and an ECU (Electronic Control Unit) 106 electrically connected to an intake-side temperature sensor 105.

The water temperature sensor 101 is attached to the cylinder block 2 in the form of entering into the coolant passage 3 to detect the temperature of coolant circulating in the coolant passage 3 as a representative temperature of the internal combustion engine 1 (an internal combustion engine representative temperature TE) representatively indicating the temperature of the internal combustion engine 1, and inputs an electric signal indicating the internal combustion engine representative temperature TE detected in this manner to the ECU 106. That is, the internal combustion engine representative temperature TE indicates the temperature of the cylinder block 2 including the combustion chamber 9 of the internal combustion engine 1 representatively as the temperature of the internal combustion engine 1.

The crank angle sensor 102 is attached to a lower case (not shown) or the like assembled to a lower part of the cylinder block 2 in the form of facing the teeth 7a formed on the outer periphery of the reluctor 7 to detect the teeth 7a rotating with the rotation of the crankshaft 6, thereby detecting the rotation speed of the crankshaft 6 as the rotation speed of the internal combustion engine 1 (an internal combustion engine rotation speed NE). The crank angle sensor 102 inputs an electric signal indicating the internal combustion engine rotation speed NE detected in this manner to the ECU 106.

The intake temperature sensor 103 is attached to the intake pipe 11 in the form of entering the intake pipe 11 to detect the temperature of air flowing into the intake pipe 11 as an intake temperature TA, and inputs an electric signal indicating the intake temperature TA detected in this manner to the ECU 106.

The throttle opening degree sensor 104 is attached to the body part of the throttle device to detect the opening degree of the throttle valve 14 as a throttle opening degree TH, and inputs an electric signal indicating the throttle opening degree TH detected in this manner to the ECU 106.

The intake-side temperature sensor 105 is attached to the cylinder block 2 or the cylinder head 8 so as to detect a wall surface temperature TCC (an inner-wall surface temperature on the side of the intake valve 12 in the cylinder block 2 or the cylinder head 8 and on the side of the combustion chamber 9) on the side of the intake valve 12, to which flames generated by light-off of an air-fuel mixture in the combustion chamber 9 by ignition thereof by the spark plug 10 hardly propagate, and inputs an electric signal indicating the wall surface temperature TCC on the side of the intake valve 12 detected in this manner to the ECU 106. Here, because the wall surface temperature TCC on the side of the intake valve 12 is the temperature in the portion, to which flames generated by light-off of the air-fuel mixture in the combustion chamber 9 hardly propagate, the wall surface temperature TCC reacts susceptibly to the combustion state of the air-fuel mixture in the combustion chamber 9. Meanwhile, in the present embodiment, because the internal combustion engine representative temperature TE is detected by the water temperature sensor 101, and representatively indicates the temperature of the cylinder block 2 including the combustion chamber 9 of the internal combustion engine 1 as the temperature of the internal combustion engine 1, the internal combustion engine representative temperature TE does not react susceptibly to the combustion state of the air-fuel mixture in the combustion chamber 9, as compared with the wall surface temperature TCC on the side of the intake valve 12. The wall surface temperature of the cylinder block 2 or the like detected by a temperature sensor other than the intake-side temperature sensor 105 can be adopted as the wall surface temperature TCC, so long as the temperature reacts susceptibly to the combustion state of the air-fuel mixture in the combustion chamber 9. Further, the temperature detected by a temperature sensor other than the water temperature sensor 101 can be adopted as the internal combustion engine representative temperature TE, so long as the temperature representatively indicates the temperature of the internal combustion engine 1. As the internal combustion engine representative temperature TE, a temperature relating to cooling/radiation of the internal combustion engine 1, which is required to consider the cooling capacity of the internal combustion engine 1 such as an oil temperature of the internal combustion engine 1 can be used. The internal combustion engine representative temperature TE can be detected directly by the temperature sensor, or can be estimated. When the internal combustion engine 1 is an air-cooled engine, the internal combustion engine representative temperature TE can be estimated by taking into consideration the influence of wind received by the internal combustion engine 1 corresponding to the traveling speed of the vehicle.

The ECU 106 operates by using power from a battery provided in a vehicle. The ECU 106 includes a microcomputer 107. The microcomputer 107 includes a memory 107a and a CPU (Central Processing Unit) 107b. The CPU 107b functions as a control unit that executes various control processes of the vehicle, such as a sensor correction process and an internal combustion engine operating-condition control process.

The memory 107a is configured by a nonvolatile memory device, and stores therein control programs and control data for the sensor correction process and the internal combustion engine operating-condition control process.

The CPU 107b uses electric signals from the water temperature sensor 101, the crank angle sensor 102, the intake temperature sensor 103, the throttle opening degree sensor 104, and the intake-side temperature sensor 105 to control the operation of the entire ECU 106.

[Configuration of Intake-Side Temperature Sensor]

A specific configuration of the intake-side temperature sensor 105 according to the present embodiment is described next in detail with reference also to FIG. 2 to FIG. 3B.

Figure 2:
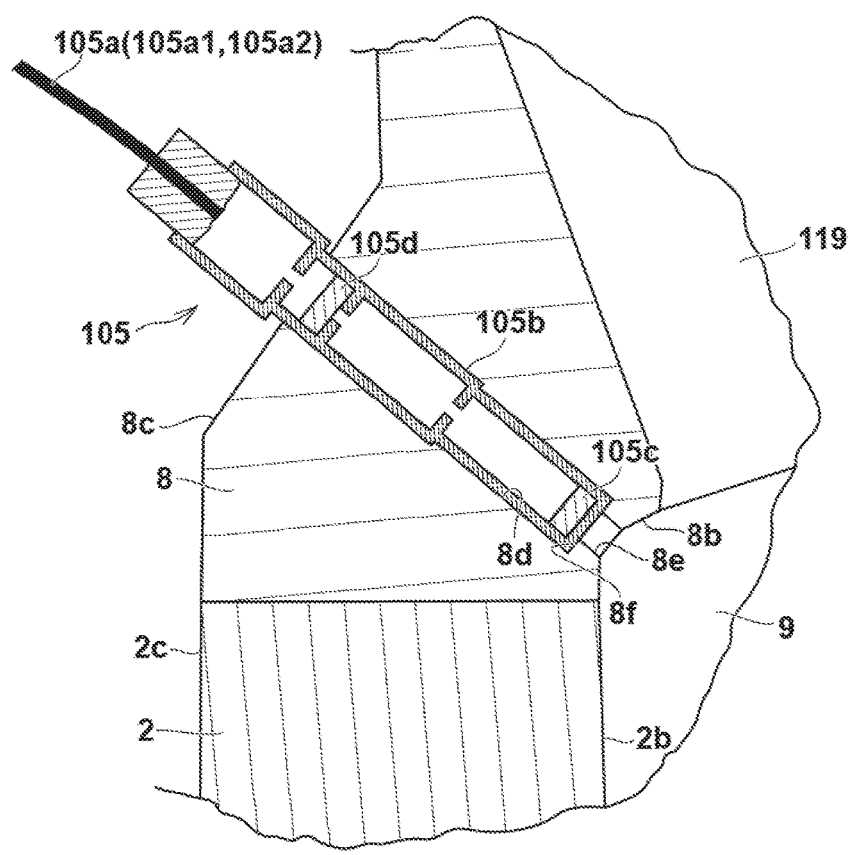
FIG. 2 is an enlarged sectional view of relevant parts showing an attachment configuration of an intake-side temperature sensor in the internal combustion engine control device according to the present embodiment.
Figure 3A:
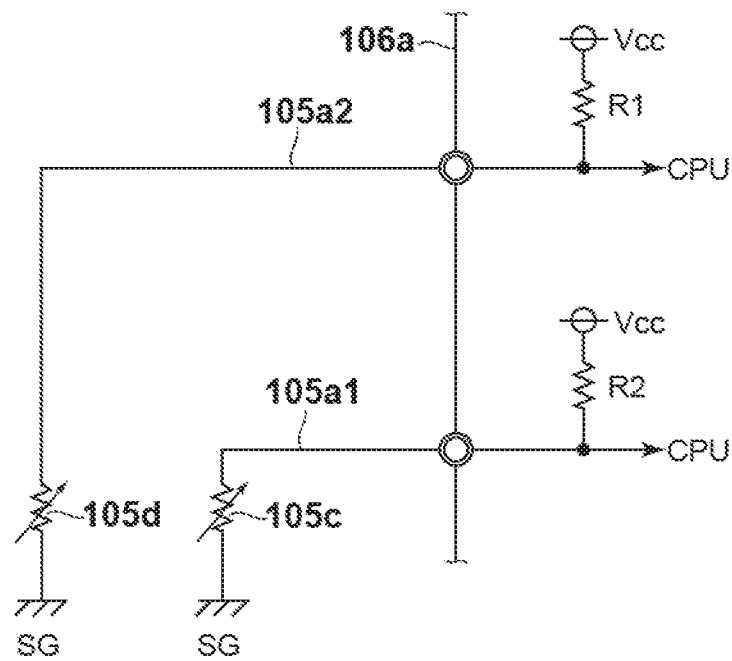
FIG. 3A is a circuit diagram of relevant parts showing a wiring configuration of the intake-side temperature sensor in the internal combustion engine control device according to the present embodiment.

FIG. 2 is an enlarged sectional view of relevant parts showing an attachment configuration of the intake-side temperature sensor 105 in the internal combustion engine control device 100 according to the present embodiment. FIG. 3A is a circuit diagram of relevant parts showing a wiring configuration of the intake-side temperature sensor 105 in the internal combustion engine control device 100 according to the present embodiment. FIG. 3B is a circuit diagram of relevant parts showing a modification of the wiring configuration of the intake-side temperature sensor 105 in the internal combustion engine control device 100 according to the present embodiment.

As shown in FIG. 2, the intake-side temperature sensor 105 mainly includes a case 105b made of a member having sufficient heat resistance and strength such as a brass member, and a first sensor element 105c and a second sensor element 105d, which are respectively arranged and sealed in the case 105b and are typically thermistors respectively. In FIG. 2, the intake-side temperature sensor 105 is attached to the cylinder head 8 as an example. However, the intake-side temperature sensor 105 can be attached to the cylinder block 2 as required.

The case 105b is a hollow cylindrical member having a housing space therein, and is attached to the cylinder head 8 by being fitted or screwed to a through hole 8d that passes completely through between an inner wall surface 8b and an outer wall surface 8c of the cylinder head 8. Here, the inner wall surface 8b of the cylinder head 8 is a part of a confining wall surface defining the combustion chamber 9, and the outer wall surface 8c of the cylinder head 8 is a part of a confining wall surface coming in contact with the atmosphere. The through hole 8d of the cylinder head 8 has a recess 8e, which is a portion opening to the inner wall surface 8b and depressed from the inner wall surface 8b toward the outer wall surface 8c, with a cross section thereof being a circular small-diameter portion. In a changing surface where a general portion of the through hole 8d changes to the recess 8e being the small diameter portion, the through hole 8d has a stepped portion 8f. That is, in a process in which the case 105b is inserted into the general portion of the through hole 8d and fitted or screwed, an apical end (the deepest portion in the through hole 8d) of the case 105b abuts on the stepped portion 8f, thereby performing positioning of the case 105b with respect to the cylinder head 8. Also, the case 105b is attached to the cylinder head 8 in a state in which the apical end of the case 105b is exposed to the combustion chamber 9 via the recess 8e. It is sufficient that the depressed depth of the recess 8e of the cylinder head 8 is generally about several millimeters, although depending on the size and the shape of the combustion chamber 9. As for the diameter of the recess 8e of the cylinder head 8, generally about several millimeters are sufficient, although depending on the diameters of the case 105b and the through hole 8d. The case 105b can be a square cylindrical member, and the shapes of the through hole 8d and the recess 8e can be defined corresponding thereto. When the intake-side temperature sensor 105 is attached to the cylinder block 2, the case 105b is fitted or screwed to a through hole that passes completely through between an inner wall surface 2b and an outer wall surface 2c in the cylinder block 2.

The first sensor element 105c is fixedly arranged at the apical end in the case 105b. Accordingly, the first sensor element 105c is arranged in the deepest portion in the through hole 8d in the state with the case 105b being fitted or screwed to the through hole 8d, so as to be adjacent to the recess 8e of the through hole 8d via a wall at the apical end of the case 105b. Consequently, the first sensor element 105c exhibits the surface temperature of the inner wall surface 8b on the side of the combustion chamber 9 in the cylinder head 8, that is, an electrical characteristic value corresponding to the temperature of the combustion chamber 9, and specifically, an electrical resistance value. In a hole axial direction of the through hole 8d, the position of the first sensor element 105c can be the same position as the inner wall surface 8b, or a position deviated toward the side of the outer wall surface 8c than the inner wall surface 8b.

The second sensor element 105d is fixedly arranged in the case 105b, positionally corresponding to the outer wall surface 8c within a range of not protruding outward from the outer wall surface 8c of the cylinder head 8. Accordingly, the second sensor element 105d is arranged in the cylinder head 8 near the outer wall surface 8c of the cylinder head 8, in the state with the case 105b being fitted or screwed to the through hole 8d. The second sensor element 105d exhibits the temperature of the outer wall on an external side of the cylinder head 8, that is, an electrical characteristic value corresponding to the representative temperature of the internal combustion engine 1, and specifically, an electrical resistance value. In the hole axial direction of the through hole 8d, the position of the second sensor element 105d can be the same position as the outer wall surface 8c so long as it is on the side of the outer wall surface 8c than the first sensor element 105c, or can be a position deviated toward the side of the inner wall surface 8b than the outer wall surface 8c. From the viewpoint of accurately matching the temperature gradient constant of the both sensors with each other, it is desired that the first sensor element 105c and the second sensor element 105d are cut out from a common base material (for example, when the base material is a sintered material, a single and common sintered material) and manufactured. When a coolant passage is provided in the cylinder head 8, it is desired to arrange the first sensor element 105c and the second sensor element 105d, putting the coolant passage therebetween. Further, it is not necessary that both the first sensor element 105c and the second sensor element 105d are provided, and when only the temperature of the combustion chamber 9 is a direct detection target, the second sensor element 105d can be omitted and can be replaced by a temperature sensor arranged in a general coolant passage of the cylinder head 8.

As shown in FIG. 3A, the first sensor element 105c and the second sensor element 105d are electrically connected to the CPU 107b of the microcomputer 107 housed in a case 106a of the ECU 106, respectively individually via two corresponding electric wirings 105a1 and 105a2. In such an electrical connection configuration, output voltages corresponding to respective electrical resistance values of the first sensor element 105c and the second sensor element 105d are input correspondingly to the CPU 107b via the two electric wirings 105a1 and 105a2. Therefore, the CPU 107b can calculate the temperature of the combustion chamber 9, the representative temperature of the internal combustion engine 1, and a differential temperature (a temperature difference) between the temperature of the combustion chamber 9 and the representative temperature of the internal combustion engine 1.

Here, the temperature of the combustion chamber 9 has a relatively short fluctuation cycle by directly reflecting the combustion state of the air-fuel mixture in the combustion chamber 9 corresponding to the propagation state of flames generated by light-off of the air-fuel mixture in the combustion chamber 9. The representative temperature of the internal combustion engine 1 representatively shows the temperature of the cylinder block 2 including the combustion chamber 9 of the internal combustion engine 1, as the temperature of internal combustion engine 1. A fluctuation cycle of the representative temperature is relatively long such that it does not susceptibly react to the combustion state of the air-fuel mixture in the combustion chamber 9, as compared with the temperature of the combustion chamber 9. Therefore, when the combustion state in the combustion chamber 9 is good, the difference between the temperature of the combustion chamber 9 and the representative temperature of the internal combustion engine 1 indicates a large value. In comparison, when an ignition timing is in a retarded state and the output of the internal combustion engine 1 is low, the difference between these temperatures indicates a small value. Therefore, the differential temperature value between the temperature of the combustion chamber 9 and the representative temperature of the internal combustion engine 1 becomes an index indicating a good or poor combustion state in the combustion chamber 9. Accordingly, the CPU 107b can control the operating condition of the internal combustion engine 1 to be a better state by controlling the ignition timing or the like so that the combustion state in the combustion chamber 9 becomes better by using the differential temperature.

Figure 3B:
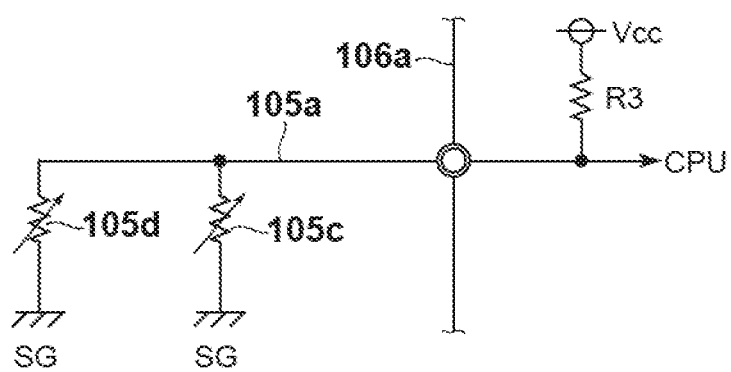
FIG. 3B is a circuit diagram of relevant parts showing a modification of the wiring configuration of the intake-side temperature sensor in the internal combustion engine control device according to the present embodiment.

The electrical connection configuration of the first sensor element 105c and the second sensor element 105d can be further simplified, and as shown in the modification in FIG. 3B, the first sensor element 105c and the second sensor element 105d can be electrically connected to the CPU 107b of the microcomputer 107 housed in the case 106a of the ECU 106 via one single electric wiring 105a. In such a connection configuration, because a single output voltage corresponding to a combined resistance value of respective electric resistance values of the first sensor element 105c and the second sensor element 105d is input to the CPU 107b via one electric wiring 105a, the electric connection configuration is simplified. Typically, the CPU 107b can calculate a differential temperature (a temperature difference) between the temperature of the combustion chamber 9 and the representative temperature of the internal combustion engine 1 according to the output voltage value thereof.

The internal combustion engine control device 100 having the configuration described above performs a sensor correction process at the time of power on of a cooling device or an internal combustion engine operating-condition control process during operation of the internal combustion engine 1 as described below, to detect the combustion state in the combustion chamber 9 and control the operating condition of the internal combustion engine 1, with a simple configuration. The operation of the internal combustion engine control device 100 at the time of performing the sensor correction process at the time of power on of a cooling device and the internal combustion engine operating-condition control process during operation of the internal combustion engine 1 is described below in detail with reference also to FIG. 4A to FIG. 5C.

[Sensor Correction Process at Time of Power on of Cooling Device]

Figure 4A:
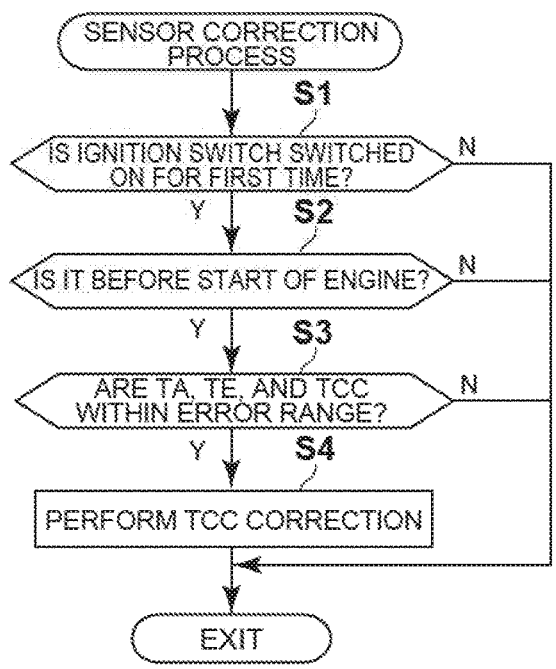
FIG. 4A is a flowchart showing a flow of a sensor correction process at the time of power on of a cooling device in the internal combustion engine control device according to the present embodiment.

The operation of the internal combustion engine control device 100 when performing the sensor correction process at the time of power on of a cooling device is described first with reference to FIG. 4A. It is desired to perform the sensor correction process at the time of power on of a cooling device in order to perform the internal combustion engine operating-condition control process during operation of the internal combustion engine 1 accurately. That is, when the sensor correction process at the time of power on of a cooling device is performed, the internal combustion engine operating-condition control process during operation of the internal combustion engine 1 is performed after completion of the sensor correction process.

FIG. 4A is a flowchart showing a flow of the sensor correction process at the time of power on of a cooling device in the internal combustion engine control device 100 according to the present embodiment.

The flowchart shown in FIG. 4A is started at a timing when an ignition switch (not shown) of a vehicle is switched on and the internal combustion engine control device 100 is activated, and the sensor correction process at the time of power on of a cooling device proceeds to a process at Step S1.

In the process at Step S1, the CPU 107*b* discriminates whether an ignition switch of a vehicle is switched on for the first time, that is, whether power of the cooling device is turned on for the first time since production of the vehicle. It can be discriminated whether power of the cooling device is turned on for the first time since production of the vehicle, for example, by referring to on/off information of a flag in the memory 107*a* that is turned on at a timing when the power of the cooling device is turned on for the first time since production of the vehicle. As a result of discrimination, if the power of the cooling device has been turned on before, the CPU 107*b* finishes the series of sensor correction process this time. On the other hand, if the power of the cooling device is turned on for the first time, the CPU 107*b* advances the sensor correction process to a process at Step S2.

In the process at Step S2, the CPU 107*b* detects the internal combustion engine rotation speed NE based on an electric signal input from the crank angle sensor 102, and discriminates whether it is before start of the internal combustion engine 1 based on the internal combustion engine rotation speed NE. As a result of discrimination, if the internal combustion engine 1 has already been started, the CPU 107*b* finishes the series of sensor correction process this time. On the other hand, if the internal combustion engine 1 has not been started yet, the CPU 107*b* advances the sensor correction process to a process at Step S3.

In the process at Step S3, the CPU 107*b* discriminates whether the intake temperature TA, the internal combustion engine representative temperature TE, and the wall surface temperature TCC on the side of the intake valve 12 are within a predetermined error range based on electric signals input from the intake temperature sensor 103, the water temperature sensor 101, and the intake-side temperature sensor 105. As a result of discrimination, if these temperatures are not within the predetermined error range, the CPU 107*b* finishes the series of sensor correction process this time. On the other hand, if these temperatures are respectively within the predetermined error range, the CPU 107*b* advances the sensor correction process to a process at Step S4.

In the process at Step S4, the CPU 107*b* corrects an error of the wall surface temperature TCC on the side of the intake valve 12 by comparing the wall surface temperature TCC on the side of the intake valve 12 with the intake temperature TA and the internal combustion engine representative temperature TE, while referring to corresponding master data stored in the memory 107*a*. For example, if the wall surface temperature TCC is higher by 2° C. than a standard temperature in the master data to be acquired by using the intake temperature TA and the internal combustion engine representative temperature TE respectively, the CPU 107*b* performs correction so that the wall surface temperature TCC is decreased by 2° C. As the master data, data obtained by setting a correspondence relation between the intake temperature TA and the internal combustion engine representative temperature TE, and the wall surface temperature TCC on the side of the intake valve 12 in the internal combustion engine 1 that exerts output characteristics of a mass production central value based on actually measured detection temperatures thereof and stored in the memory 107*a* is used. The correction can be performed by using either one of the intake temperature TA and the internal combustion engine representative temperature TE, or can be performed by using another reference temperature as required. As a result, the correction of the intake-side temperature sensor 105 is performed accurately so that performance in mass-production central specifications of the internal combustion engine 1 is exerted, which leads to a result such that the internal combustion engine operating-condition control process during operation of the internal combustion engine 1 is accurately performed. Accordingly, the process at Step S4 finishes, to finish the series of sensor correction process this time.

[Internal Combustion Engine Operating-Condition Control Process During Operation of Internal Combustion Engine]

The operation of the internal combustion engine control device 100 at the time of performing the internal combustion engine operating-condition control process during operation of the internal combustion engine 1 is described with reference also to FIG. 4B, and FIGS. 5A to 5C.

Figure 4B:
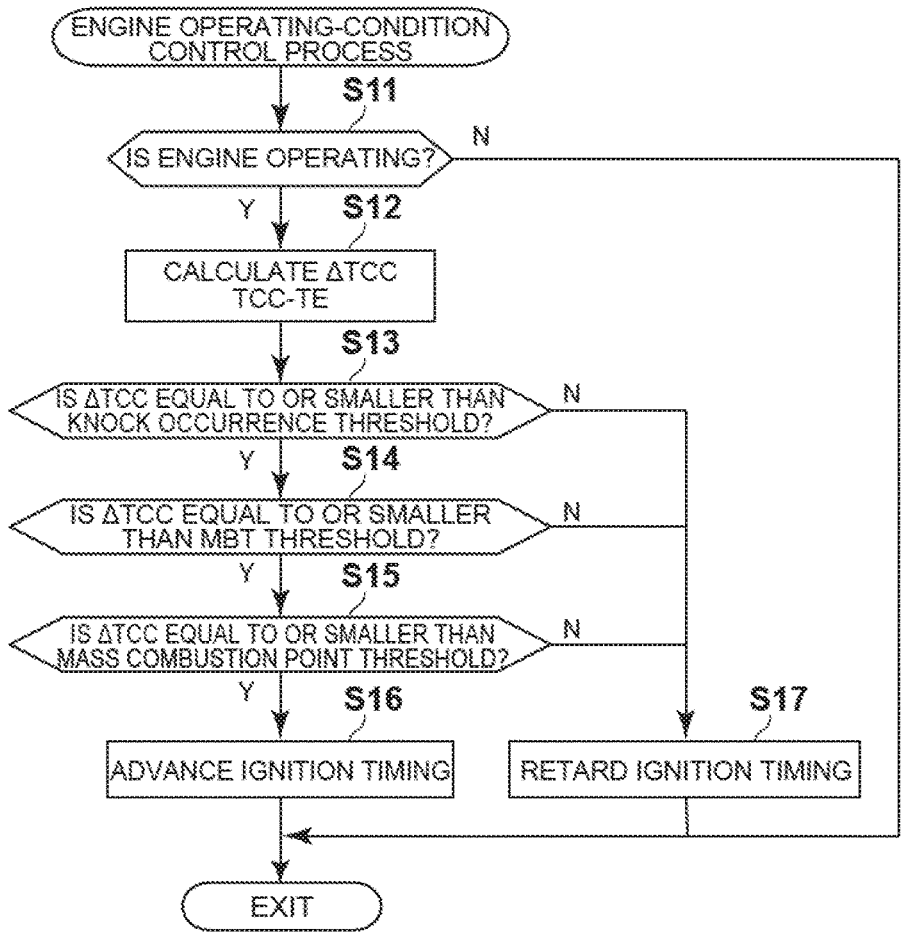
FIG. 4B is a flowchart showing a flow of an internal combustion engine operating-condition control process during operation of the internal combustion engine in the internal combustion engine control device according to the present embodiment.
Figure 5A:
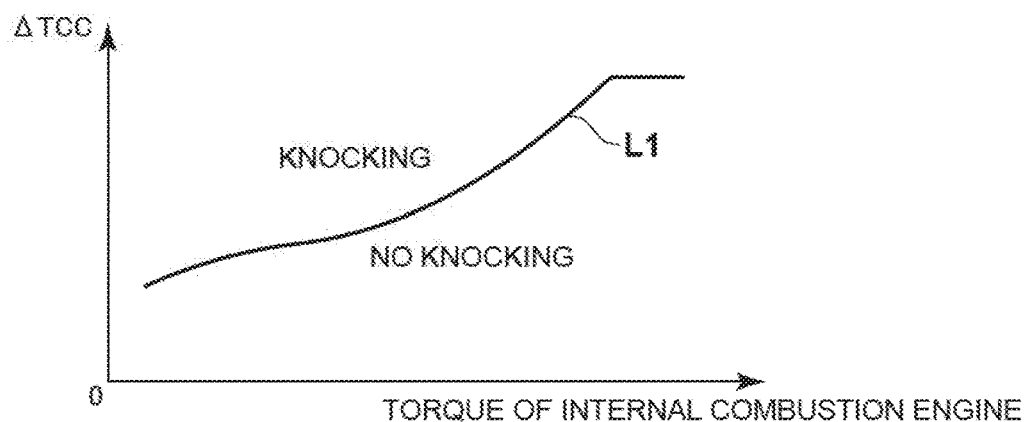
FIG. 5A is a schematic diagram of a characteristic curve showing a relation between torque generated by the internal combustion engine and a knock occurrence threshold to be used in the internal combustion engine operating-condition control process in the internal combustion engine control device according to the present embodiment.
Figure 5B:
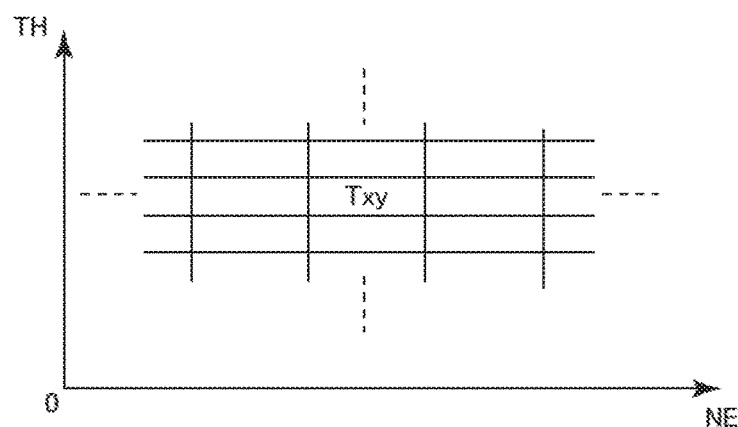
FIG. 5B is a schematic diagram of table data showing a relation between both an internal combustion engine rotation speed and a throttle opening degree and an MBT threshold to be used in the internal combustion engine operating-condition control process in the internal combustion engine control device according to the present embodiment.
Figure 5C:
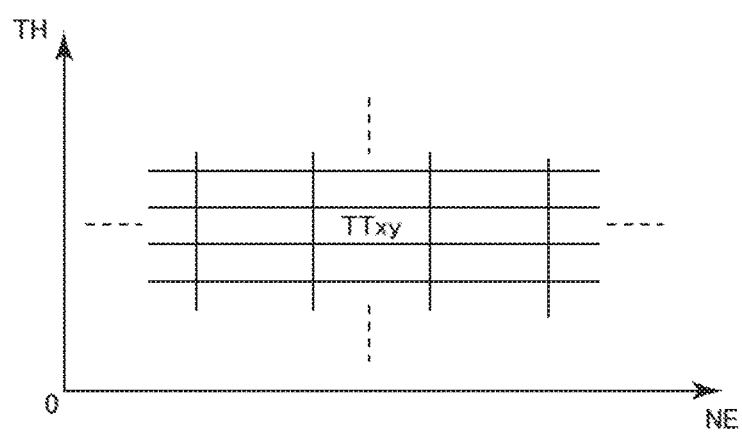
FIG. 5C is a schematic diagram of table data showing a relation between both an internal combustion engine rotation speed and a throttle opening degree and a mass combustion point threshold to be used in the internal combustion engine operating-condition control process in the internal combustion engine control device according to the present embodiment.

FIG. 4B is a flowchart showing a flow of the internal combustion engine operating-condition control process during operation of the internal combustion engine 1 in the internal combustion engine control device 100 according to the present embodiment. FIG. 5A is a schematic diagram of a characteristic curve showing a relation between torque generated by the internal combustion engine 1 and a knock occurrence threshold to be used in the internal combustion engine operating-condition control process in the internal combustion engine control device 100 according to the present embodiment. FIG. 5B is a schematic diagram of table data showing a relation between both an internal combustion engine rotation speed and a throttle opening degree and an MBT threshold to be used in the internal combustion engine operating-condition control process in the internal combustion engine control device 100 according to the present embodiment. FIG. 5C is a schematic diagram of table data showing a relation between both the internal combustion engine rotation speed and the throttle opening degree and a mass combustion point threshold (value) to be used in the internal combustion engine operating-condition control process in the internal combustion engine control device 100 according to the present embodiment.

The flowchart shown in FIG. 4B is started at a timing when an ignition switch (not shown) of a vehicle is switched on and the internal combustion engine control device 100 is activated, and the internal combustion engine operating-condition control process during operation of the internal combustion engine 1 proceeds to a process at Step S11. The internal combustion engine operating-condition control process during operation of the internal combustion engine 1 is repeatedly performed at every predetermined control cycle, while the internal combustion engine control device 100 is operating.

In the process at Step S11, the CPU 107*b* detects the internal combustion engine rotation speed NE based on an electric signal input from the crank angle sensor 102 to discriminate whether the internal combustion engine 1 is operating based on the internal combustion engine rotation speed NE. As a result of discrimination, if the internal combustion engine 1 is not operating, the CPU 107*b* finishes the series of internal combustion engine operating-condition control process this time. On the other hand, if the internal combustion engine 1 is operating, the CPU 107*b* advances the internal combustion engine operating-condition control process to a process at Step S12.

In the process at Step S12, the CPU 107*b* calculates a difference ΔTCC (=TCC−TE) between the internal combustion engine representative temperature TE and the wall surface temperature TCC on the side of the intake valve 12, based on an electric signals input from the water temperature sensor 101 and the intake-side temperature sensor 105. Here, the wall surface temperature TCC on the side of the intake valve 12 is the temperature of the portion to which flames generated by light-off of the air-fuel mixture in the combustion chamber 9 hardly propagate, and temperature susceptibly reacting to the combustion state of the air-fuel mixture in the combustion chamber 9. The internal combustion engine representative temperature TE is the temperature representatively indicating the temperature of the cylinder block 2 including the combustion chamber 9 of the internal combustion engine 1 as the temperature of the internal combustion engine 1 and not reacting susceptibly to the combustion state of the air-fuel mixture in the combustion chamber 9, as compared with the wall surface temperature TCC on the side of the intake valve 12. Therefore, the difference ΔTCC between these temperatures indicates a large value when the combustion state in the combustion chamber 9 is good. On the contrary, when the ignition timing is in a retarded state and the output of the internal combustion engine 1 is low, the difference ΔTCC indicates a small value. Therefore, the value of the difference ΔTCC between the internal combustion engine representative temperature TE and the wall surface temperature TCC on the side of the intake valve 12 becomes an index indicating a good or poor combustion state in the combustion chamber 3. Accordingly, the process at Step S12 finishes, and the internal combustion engine operating-condition control process proceeds to a process at Step S13.

In the process at Step S13, the CPU 107b discriminates whether the value of the difference ΔTCC calculated in the process at Step S12 is equal to or smaller than a threshold corresponding to a knocking level of the internal combustion engine 1 (the knock occurrence threshold). Specifically, in the present embodiment, data of a characteristic curve L1 defining the knock occurrence threshold with respect to torque of the internal combustion engine as shown in FIG. 5A is stored in the memory 107a. The CPU 107b calculates the internal combustion engine rotation speed NE and the throttle opening degree TH based on electric signals input from the crank angle sensor 102 and the throttle opening degree sensor 104, to derive the torque of the internal combustion engine based on the internal combustion engine rotation speed NE and the throttle opening degree TH and reads the knock occurrence threshold corresponding to the torque of the internal combustion engine from the data of the characteristic curve L1 shown in FIG. 5A. The CPU 107b discriminates whether the value of the difference ΔTCC is equal to or smaller than the read knock occurrence threshold. As a result of discrimination, if the value of the ΔTCC is larger than the knock occurrence threshold, the CPU 107b advances the internal combustion engine operating-condition control process to a process at Step S17. On the other hand, if the value of the ΔTCC is equal to or smaller than the knock occurrence threshold, the CPU 107b advances the internal combustion engine operating-condition control process to a process at Step S14.

In the process at Step S14, the CPU 107b discriminates whether the value of the difference ΔTCC calculated in the process at Step S12 is equal to or smaller than a threshold corresponding to the ignition timing at which the torque of the internal combustion engine 1 becomes maximum (MBT (Minimum advance for the Best Torque) threshold). Specifically, in the present embodiment, table data in which a value Txy of the MBT threshold is associated with the internal combustion engine rotation speed NE and the throttle opening degree TH as shown in FIG. 5B is stored in the memory 107a. The CPU 107b reads the MBT threshold Txy corresponding to the internal combustion engine rotation speed NE and the throttle opening degree TH from the table data shown in FIG. 5B, based on electric signals input from the crank angle sensor 102 and the throttle opening degree sensor 104. The CPU 107b discriminates whether the value of the difference ΔTCC is equal to or smaller than the read MBT threshold Txy. As a result of discrimination, if the value of the difference ΔTCC is larger than the MBT threshold Txy, the CPU 107b advances the internal combustion engine operating-condition control process to the process at Step S17. On the other hand, if the value of the difference ΔTCC is equal to or smaller than the MBT threshold Txy, the CPU 107b advances the internal combustion engine operating-condition control process to a process at Step S15.

In the process at Step S15, the CPU 107b discriminates whether the value of the difference ΔTCC calculated in the process at Step S12 is equal to or smaller than a threshold corresponding to a predetermined (for example, 50%) mass combustion crank angle of the internal combustion engine 1 (mass combustion point threshold). Specifically, in the present embodiment, table data in which a value TTxy of the mass combustion point threshold is associated with the internal combustion engine rotation speed NE and the throttle opening degree TH as shown in FIG. 5C is stored in the memory 107a. The CPU 107b reads the mass combustion point threshold TTxy corresponding to the current internal combustion engine rotation speed NE and throttle opening degree TH from the table data shown in FIG. 5C based on electric signals input from the crank angle sensor 102 and the throttle opening degree sensor 104. The CPU 107b discriminates whether the value of the difference ΔTCC is equal to or smaller than the read mass combustion point threshold TTxy. As a result of discrimination, if the value of the difference ΔTCC is larger than the mass combustion point threshold TTxy, the CPU 107b advances the internal combustion engine operating-condition control process to the process at Step S17. On the other hand, if the value of the difference ΔTCC is equal to or smaller than the mass combustion point threshold TTxy, the CPU 107b advances the internal combustion engine operating-condition control process to a process at Step S16.

In the process at Step S16, the CPU 107b typically executes feedback control of the ignition timing of the spark plug 10 to advance the ignition timing of the air-fuel mixture in the combustion chamber 9, thereby controlling the operating condition of the internal combustion engine 1. Accordingly, the process at Step S16 is complete, and the series of internal combustion engine operating-condition control process finishes.

In the process at Step S17, the CPU 107b typically executes feedback control of the ignition timing of the spark plug 10 to retard the ignition timing of the air-fuel mixture in the combustion chamber 9, thereby controlling the operating condition of the internal combustion engine 1. Accordingly, the process at Step S17 is complete, and the series of internal combustion engine operating-condition control process finishes.

An example of a timing chart of the operating condition control of the internal combustion engine 1 by performing the internal combustion engine operating-condition control process, when the internal combustion engine 1 is operating, to which the internal combustion engine operating-condition control process in the internal combustion engine control device 100 is applied, is described with reference also to FIG. 6.

Figure 6:
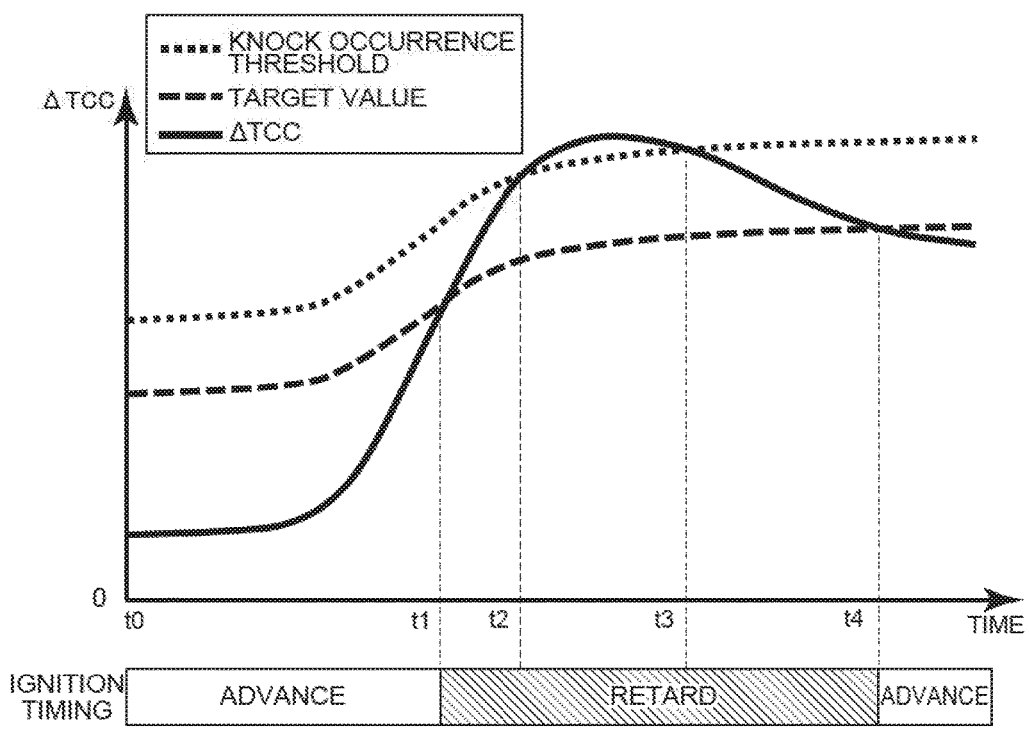
FIG. 6 is a timing chart of an internal combustion engine operating-condition control process at the time of acceleration of a vehicle in the internal combustion engine control device according to the present embodiment.

FIG. 6 is a timing chart of the internal combustion engine operating-condition control process at the time of acceleration of a vehicle in the internal combustion engine control device 100 according to the present embodiment. In FIG. 6, the MBT threshold Txy or the mass combustion point threshold TTxy is indicated as a target value, and the target value is shown to have a smaller value than a knock occurrence value. The MBT threshold Txy or the mass combustion point threshold TTxy shown in FIG. 5B or 5C is set based on the rotation speed and the throttle opening degree of the internal combustion engine 1, that is, based on torque of the internal combustion engine 1.

As shown in FIG. 6, in a period from a time t0 to a time t1 after warm-up of the internal combustion engine 1, because the value of the difference ΔTCC between the internal combustion engine representative temperature TE and the wall surface temperature TCC on the side of the intake valve 12 is equal to or smaller than the target value (the MBT threshold Txy or the mass combustion point threshold TTxy), the ignition timing of the spark plug 10 is advanced.

Next, in a period from the time t1 to a time t4, because the value of the difference ΔTCC is larger than the target value, the ignition timing of the spark plug 10 is retarded. Here, in a period of a time t2 to a time t3, because the value of the difference ΔTCC is larger than not only the target value but also the knock occurrence threshold, it is desired to increase a retarded amount of the ignition timing of the spark plug 10, as compared with a period from the time t1 to the time t2 and a period from the time t3 to the time t4, in order to converge the difference ΔTCC to the target value promptly.

In a period after the time t4, because the value of the difference ΔTCC is equal to or smaller than the target value, the ignition timing of the spark plug 10 is advanced.

Incidentally, to simplify the internal combustion engine operating-condition control process during operation of the internal combustion engine 1, the ignition timing of the spark plug 10 can be controlled based directly on the value of the difference ΔTCC calculated in the process at Step S12. In this case, the respective processes from Step S13 to Step S15 can be omitted. Specifically, a table, a map, or the like in which an advanced amount or a retarded amount of the ignition timing of the spark plug 10 is allocated with respect to the difference ΔTCC can be stored in the memory 107a beforehand, and the CPU 107b can retrieve the advanced amount or the retarded amount of the ignition timing of the spark plug 10 from the table, the map, or the like based on the difference ΔTCC. As the parameters for controlling the operating condition of the internal combustion engine 1, a fuel injection amount, an air supply amount, an EGR amount, and the like can be mentioned other than the ignition timing. Therefore, the fuel injection amount, the air supply amount, the EGR amount, and the like can be adjusted other than adjustment of the ignition timing to control the operating condition of the internal combustion engine 1, or these amounts can be combined, appropriately to control the operating condition of the internal combustion engine 1. Further, a ratio between the internal combustion engine representative temperature TE and the wall surface temperature TCC on the side of the intake valve 12 can be used instead of the difference ΔTCC between the internal combustion engine representative temperature TE and the wall surface temperature TCC on the side of the intake valve 12. Needless to mention, the data of the characteristic curve L1 shown in FIG. 5A and the table data shown in FIG. 5B and FIG. 5C can be set so as to be able to obtain an individual output itself of the internal combustion engine 1 in addition to set so that an output of the internal combustion engine 1 that exerts the output characteristics of the mass production central value (a master internal combustion engine) can be acquired.

When the internal combustion engine 1 indicates an individual difference with respect to the master internal combustion engine in the relation between the torque generated by the internal combustion engine 1 and the difference ΔTCC between the internal combustion engine representative temperature TE and the wall surface temperature TCC on the side of the intake valve 12, a preferable example of how to calculate the difference ΔTCC is described below with reference also to FIG. 7.

Figure 7:
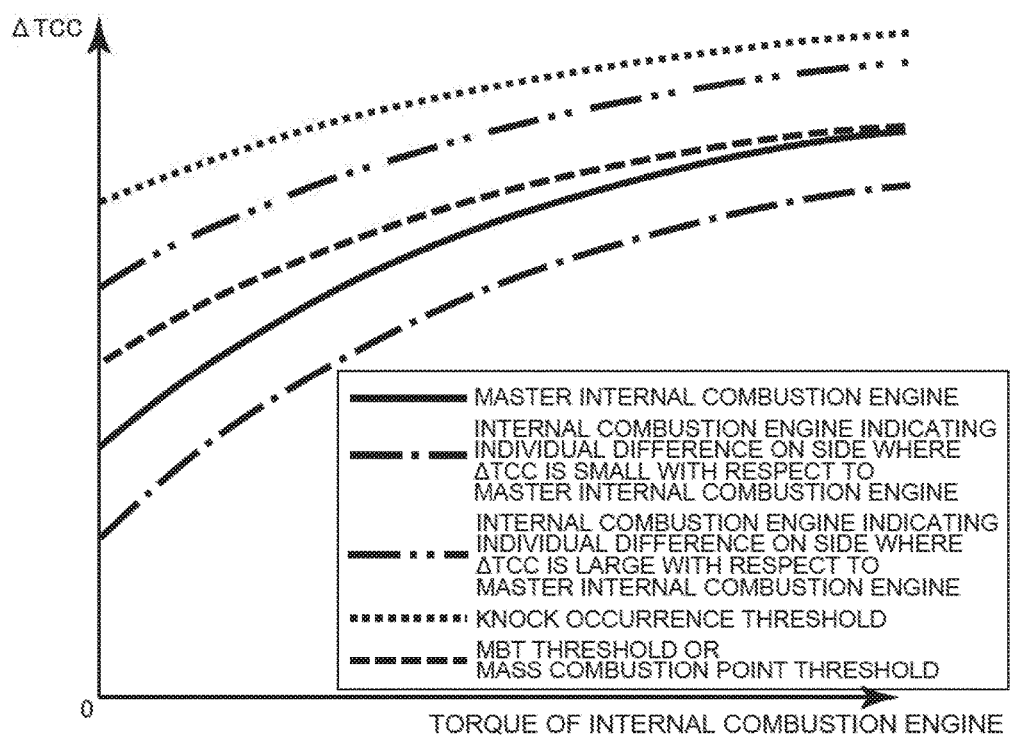
FIG. 7 is a diagram showing a relation between torque and a difference between a first temperature and a second temperature with regard to a master internal combustion engine and an internal combustion engine indicating an individual difference with respect to the master internal combustion engine according to the present embodiment.

FIG. 7 is a diagram showing a relation between the torque and the difference ΔTCC between the first temperature and the second temperature with regard to a master internal combustion engine and an internal combustion engine indicating an individual difference with respect to the master internal combustion engine.

For example, as shown in FIG. 7, when the internal combustion engine 1 indicates an individual difference on the side where the difference ΔTCC is small with respect to the master internal combustion engine, by setting the ignition timing of the spark plug 10 to an advanced side, the difference ΔTCC is increased toward the MBT threshold Txy or the mass combustion point threshold TTxy so that high efficiency can be achieved. On the other hand, for example, as shown in FIG. 7, when the internal combustion engine 1 indicates an individual difference on the side where the difference ΔTCC is large with respect to the master internal combustion engine, by setting the ignition timing of the spark plug 10 to a retarded side, the difference ΔTCC is reduced and occurrence of knock can be suppressed. That is, according to the internal combustion engine control device 100 of the present embodiment, when the internal combustion engine 1 indicates an individual difference with respect to the master internal combustion engine regarding the relation between torque and the difference ΔTCC, efficient control can be achieved.

Also, in the internal combustion engine operating-condition control process of the internal combustion engine control device 100 according to the present embodiment described above, three types of thresholds such as the knock occurrence threshold, the MBT threshold, and the mass combustion point threshold are applied in the series of threshold discrimination processes from Step S13 to Step S15. However, the order of preference and combination of these thresholds can be changed in the process according to the combustion characteristics and specification of the internal combustion engine 1, and the type and specification of fuel used therein. Modifications in which the order of preference and combination of these thresholds are changed in the process are described below in detail, with reference also to FIG. 8 to FIG. 10.

Figure 8:
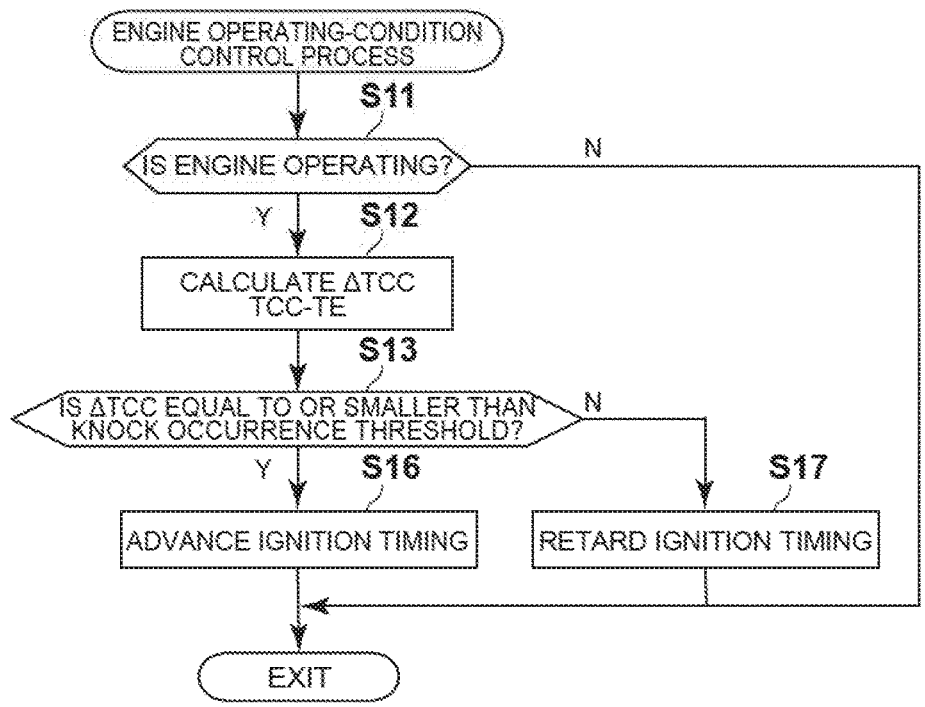
FIG. 8 is a flowchart indicating a flow of an internal combustion engine operating-condition control process in a modification of the present embodiment.
Figure 9:
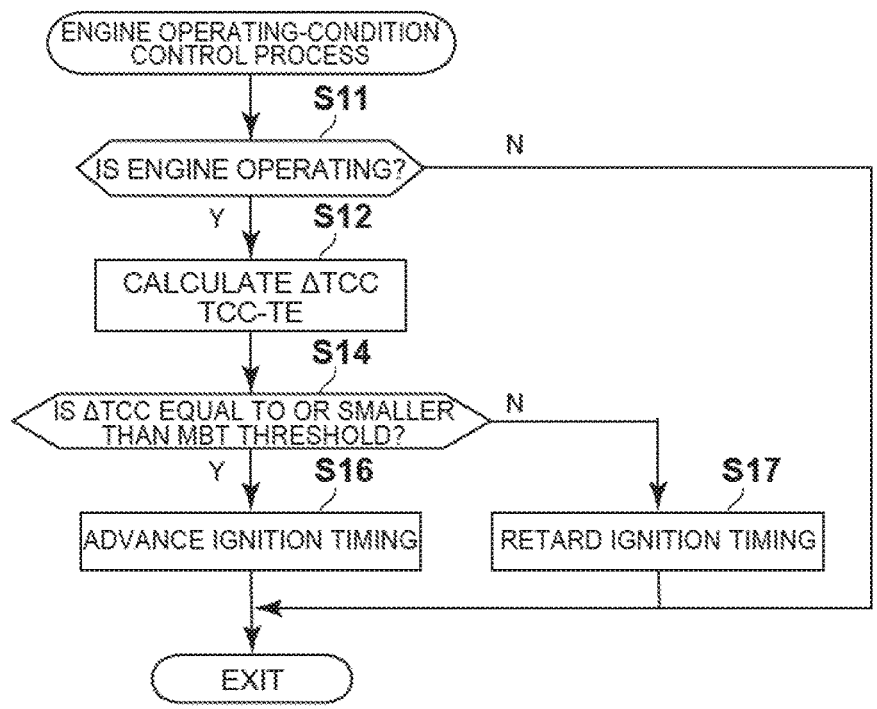
FIG. 9 is a flowchart indicating a flow of an internal combustion engine operating-condition control process in another modification of the present embodiment.

FIG. 8 is a flowchart showing a flow of an internal combustion engine operating-condition control process in a modification of the present embodiment. FIG. 9 is a flowchart showing a flow of an internal combustion engine operating-condition control process in another modification of the present embodiment. FIG. 10 is a flowchart showing a flow of an internal combustion engine operating-condition control process in still another modification of the present embodiment.

First, the series of threshold discrimination processes from Step S13 to Step S15 shown in FIG. 4B described above are preferably applied to the internal combustion engine 1 in which the difference ΔTCC between the internal combustion engine representative temperature TE and the wall surface temperature TCC on the side of the intake valve 12 decreases corresponding to the knock occurrence threshold, the MBT threshold, and the mass combustion point threshold in this order and a combination example of fuel to be used therein. In the internal combustion engine 1 mounted on commercially available two-wheeled automobiles, such a configuration example is generally used practically.

Meanwhile, there is a case where the difference ΔTCC itself shows a relatively small value practically, depending on the combustion characteristics and specification of the internal combustion engine 1 and the type and specification of fuel used therein. In such a case, by performing the threshold discrimination process only for the knock occurrence threshold, practically good combustion characteristics in the internal combustion engine 1 can be acquired, while simplifying the internal combustion engine operating-condition control process. The flow of the internal combustion engine operating-condition control process in which the threshold discrimination process is performed only for the knock occurrence threshold is shown in FIG. 8. In this flow, the threshold discrimination process to which only the knock occurrence threshold at Step S13 shown in FIG. 4B is applied is performed.

Depending on the specification or the like of the internal combustion engine 1, there is a case where the most important setting is to realize the ignition timing at which output torque of the internal combustion engine 1 becomes maximum. In such a case, by performing the threshold discrimination process only for the MBT threshold, practically required output characteristics in the internal combustion engine 1 can be acquired, while simplifying the internal combustion engine operating-condition control process. The flow of the internal combustion engine operating-condition control process in which the threshold discrimination process is performed only for the MBT threshold is shown in FIG. 9. In this flow, the threshold discrimination process to which only the MBT threshold at Step S14 shown in FIG. 4B is applied is performed.

Further, depending on the type or the like of fuel to be used in the internal combustion engine 1, there is a case where the most important setting is to realize a combustion period, taking into consideration the impact of fuel on the combustion of the internal combustion engine 1. In such a case, by performing the threshold discrimination process only for the mass combustion point threshold, practically required combustion characteristics in the internal combustion engine 1 can be acquired, while simplifying the internal combustion engine operating-condition control process. In this way, the flow of the internal combustion engine operating-condition control process in which the threshold discrimination process is performed only for the mass combustion point threshold is shown in FIG. 10. In this flow, the threshold discrimination process to which only the mass combustion point threshold at Step S15 shown in FIG. 4B is applied is performed.

As is obvious from the above descriptions, in the internal combustion engine control device 100 according to the present embodiment, the control unit 107b controls the operating condition of the internal combustion engine 1 based on the first temperature TCC corresponding to the temperature of the first portion in the wall defining the combustion chamber 9 of the internal combustion engine 1, and the second temperature TE corresponding to the temperature of the second portion on the outer wall surface side than the first portion in the wall. Accordingly, the combustion state in the combustion chamber 9 can be detected and the operating condition of the internal combustion engine 1 can be controlled according to the combustion state with a simple configuration. Particularly, the first temperature TCC corresponding to the temperature of the first portion to which flames generated by light-off of the air-fuel mixture in the combustion chamber 9 hardly propagate and the second temperature TE corresponding to the temperature of the second portion can be used as appropriate indices indicating a good or poor combustion state in the combustion chamber 9. Therefore, even in a transient temperature state such as during a warm-up operation of the internal combustion engine 1 or in a low temperature state caused by operating the internal combustion engine 1 with the relatively low load, the combustion state in the combustion chamber 9 can be ascertained accurately to control the operating condition of the internal combustion engine 1. Further, by appropriately controlling the operating condition of the internal combustion engine 1, the fuel consumption rate of the internal combustion engine 1 can be improved. Also, in the conventional internal combustion engine, the threshold of an ignition timing corresponding to occurrence of knock is set to be large on the retarded side, taking the individual difference into consideration, and thus there is still room for achieving high efficiency. However, according to the internal combustion engine control device 100 of the present embodiment, it is not necessary to take the individual difference of the internal combustion engine into consideration, and the threshold of an ignition timing can be set to be further on the advanced side, thereby enabling to achieve higher efficiency of the internal combustion engine 1. Particularly, because the cooling capacity of the internal combustion engine 1 can be also taken into consideration based on the first temperature TCC and the second temperature TE, for example, if the cooling capacity is sufficient, the ignition timing can be set to the advanced side to achieve higher efficiency of the internal combustion engine 1. Further, in the knock sensor, when considering that as the rotation speed of the internal combustion engine of a vehicle increases, there is a tendency to misjudge oscillations caused by various factors of the vehicle as the oscillations caused by knock, oscillations of the vehicle need not be detected by the knock sensor by detecting the first temperature TCC and the second temperature TE. Accordingly, it can be prevented that oscillations caused by various factors of the vehicle are misjudged as the oscillations caused by knock.

According to the internal combustion engine control device 100 of the present embodiment, the control unit 107b derives the value ΔTCC based on the first temperature TCC and the second temperature TE, and sets a predetermined threshold based on torque of the internal combustion engine 1, to control the operating condition of the internal combustion engine 1 based on the value ΔTCC and the predetermined threshold. Accordingly, the operating condition of the internal combustion engine 1 can be controlled appropriately based on the value ΔTCC and the predetermined threshold.

According to the internal combustion engine control device 100 of the present embodiment, the value ΔTCC is a difference or a ratio between the first temperature TCC and the second temperature TE. Accordingly, the operating condition of the internal combustion engine 1 can be controlled appropriately based on the difference or the ratio between both the first temperature TCC and the second temperature TE and the predetermined threshold.

According to the internal combustion engine control device 100 of the present embodiment, the control unit 107b executes control to advance or retard the timing of ignition of the internal combustion engine 1 depending on a magnitude relation between the value ΔTCC and the predetermined threshold, and the predetermined threshold is a threshold corresponding to the knocking level of the internal combustion engine 1. Accordingly, the operating condition of the internal combustion engine 1 can be controlled accurately so as to suppress occurrence of knock, while controlling the ignition timing accurately.

According to the internal combustion engine control device 100 of the present embodiment, the control unit 107b sets the predetermined threshold Txy corresponding to an ignition timing at which torque of the internal combustion engine 1 becomes maximum. Accordingly, the operating condition of the internal combustion engine 1 can be controlled accurately so as to generate maximum torque, while controlling the ignition timing accurately.

According to the internal combustion engine control device 100 of the present embodiment, the control unit 107b sets the predetermined threshold TTxy corresponding to a predetermined mass combustion crank angle of the internal combustion engine 1. Accordingly, the operating condition of the internal combustion engine 1 can be controlled more accurately, while controlling the ignition timing more accurately corresponding to the predetermined mass combustion crank angle.

According to the internal combustion engine control device 100 of the present embodiment, the first temperature TCC is detected by the temperature sensor 105 attached to the attachment portion of the internal combustion engine 1 on the side of the intake valve 12, as the temperature of the wall on the side of the intake valve 12 of the internal combustion engine 1. Accordingly, the temperature of the wall on the side of the intake valve 12 of the internal combustion engine 1 in which such a tendency that flames generated by light-off of an air-fuel mixture in the combustion chamber 9 hardly propagate appears notably can be used. By using the first temperature TCC, the combustion state in the combustion chamber 9 can be detected reliably and the operating condition of the internal combustion engine 1 can be controlled according to the combustion state.

According to the internal combustion engine control device 100 of the present embodiment, the first temperature sensor element 105c of the temperature sensor 105 is attached to the internal combustion engine 1 so as to be exposed to the combustion chamber 9, via the recess 8e that is depressed from the inner wall surface 8b of the wall defining the combustion chamber 9 of the internal combustion engine 1, and opens to the inner wall surface 8b. Accordingly, the first temperature TCC is detected by the first temperature sensor element 105c and the operating condition of the internal combustion engine 1 can be controlled according to the detected temperature with a simple configuration. Particularly, by arranging the first temperature sensor element 105c in the case 105b of the temperature sensor 105 so as to correspond to the recess 8e that opens to the inner wall surface of the cylinder head 8 or the cylinder block 2 defining the combustion chamber 9 and depressed therefrom, the first temperature TCC can be directly detected, while absorbing the impact received from the combustion flow. Further, by using the first temperature TCC, the operating condition of the internal combustion engine 1 can be controlled, while accurately ascertaining the combustion state in the combustion chamber 9.

According to the internal combustion engine control device 100 of the present embodiment, the temperature sensor 105 is a single temperature sensor in which the first temperature sensor element 105c and the second temperature sensor element 105d share the case 105b, and the control unit 107b controls the operating condition of the internal combustion engine 1 by using the first temperature TCC detected by the first temperature sensor element 105c and the second temperature TE detected by the second temperature sensor element 105d. Accordingly, the first temperature TCC and the second temperature TE can be detected, while simplifying the configuration of the temperature sensor 105.

According to the internal combustion engine control device 100 of the present embodiment, the control unit 107b controls the operating condition of the internal combustion engine 1 based on the difference ΔTCC between the first temperature TCC corresponding to the wall surface temperature of the combustion chamber 9 of the internal combustion engine 1, and the second temperature TE corresponding to the representative temperature of the internal combustion engine 1. Accordingly, the combustion state in the combustion chamber 9 can be detected and the operating condition of the internal combustion engine 1 can be controlled according to the combustion state with a simple configuration. Particularly, the difference ΔTCC between the wall surface temperature TCC of the combustion chamber 9, to which flames generated by light-off of the air-fuel mixture in the combustion chamber 9 hardly propagate, and the internal combustion engine representative temperature TE representatively indicating the temperature of the cylinder block 2 including the combustion chamber 9 as the temperature of the internal combustion engine 1 can be used as an appropriate index indicating a good or poor combustion state in the combustion chamber 9. Therefore, even in a transient temperature state such as during a warm-up operation of the internal combustion engine 1 or in a low temperature state caused by the internal combustion engine 1 being operated with a relatively low load, the combustion state in the combustion chamber 9 can be ascertained accurately to control the operating condition of the internal combustion engine 1. Further, by appropriately controlling the operating condition of the internal combustion engine 1, the fuel consumption rate of the internal combustion engine 1 can be improved.

According to the internal combustion engine control device 100 of the present embodiment, the first temperature TCC is detected by the temperature sensor 105 attached to the attachment portion of the internal combustion engine 1 on the side of the intake valve 12, as the wall surface temperature of the combustion chamber 9 of the internal combustion engine 1 on the side of the intake valve 12. Accordingly, the wall surface temperature of the combustion chamber 9 of the internal combustion engine 1 on the side of the intake valve 12, in which such a tendency that flames generated by light-off of the air-fuel mixture in the combustion chamber 9 hardly propagate appears notably, can be used as the first temperature TCC. By using the first temperature TCC, the combustion state in the combustion chamber 9 can be detected reliably and the operating condition of the internal combustion engine 1 can be controlled according to the combustion state.

According to the internal combustion engine control device 100 of the present embodiment, the control unit 107b controls the timing of ignition of the air-fuel mixture based on the difference ΔTCC between the first temperature TCC and the second temperature TE, to control the operating condition of the internal combustion engine 1. Accordingly, the operating condition of the internal combustion engine 1 can be controlled appropriately, while controlling the ignition timing appropriately.

According to the internal combustion engine control device 100 of the present embodiment, the control unit 107b controls to advance or retard the timing of ignition according to the magnitude relation between the difference ΔTCC between the first temperature TCC and the second temperature TE, and a predetermined threshold, and the predetermined threshold is set to include the first threshold corresponding to the knocking level of the internal combustion engine 1. Accordingly, the operating condition of the internal combustion engine 1 can be controlled accurately so as to suppress occurrence of knock, while controlling the ignition timing accurately.

According to the internal combustion engine control device 100 of the present embodiment, the predetermined threshold is set to further include a second threshold corresponding to the ignition timing at which torque of the internal combustion engine 1 becomes maximum. Accordingly, the operating condition of the internal combustion engine 1 can be controlled accurately so as to generate maximum torque, while controlling the ignition timing accurately.

According to the internal combustion engine control device 100 of the present embodiment, the predetermined threshold is set to further include a third threshold corresponding to the predetermined mass combustion crank angle of the internal combustion engine 1. Accordingly, the operating condition of the internal combustion engine 1 can be controlled more accurately, while controlling the ignition timing more accurately corresponding to the predetermined mass combustion crank angle.

According to the internal combustion engine control device 100 of the present embodiment, the control unit 107b controls the operating condition of the internal combustion engine 1 by using the temperature of the combustion chamber 9 calculated based on temperature information of the combustion chamber 9 detected by the first temperature sensor element 105c of the temperature sensor 105 attached to the internal combustion engine 1 so as to be exposed to the combustion chamber 9, via the recess 8e that is depressed from the inner wall surface 8b of the wall defining the combustion chamber 9 of the internal combustion engine 1, and opens to the inner wall surface 8b. Accordingly, the temperature and the like of the combustion chamber 9 of the internal combustion engine 1 can be detected and the operating condition of the internal combustion engine 1 can be controlled according to the detected temperature with a simple configuration. Particularly, by arranging the first temperature sensor element 105c in the case 105b of the temperature sensor 105 so as to correspond to the recess 8e that opens to the inner wall surface of the cylinder head 8 or the cylinder block 2 defining the combustion chamber 9 and depressed therefrom, the temperature of the combustion chamber 9 can be directly detected, while absorbing the impact received from the combustion flow. Further, by using the temperature of the combustion chamber 9, the operating condition of the internal combustion engine 1 can be controlled, while accurately ascertaining the combustion state in the combustion chamber 9.

In the present invention, the type, form, arrangement, number, and the like, of the constituent members are not limited to those described in the above embodiment, and it is needless to mention that the constituent elements can be modified as appropriate without departing from the scope of the invention, such as appropriately replacing these constituent elements with other elements having equivalent operational effects.

INDUSTRIAL APPLICABILITY

As described above, the present invention can provide an internal combustion engine control device that can detect a combustion state in a combustion chamber and control the operating condition of an internal combustion, engine according to the combustion state. Therefore, because of its general purposes and universal characteristics, applications of the present invention can be expected in a wide range in an infernal combustion engine control device of a vehicle or the like.

The invention claimed is:

1. An internal combustion engine control device comprising a control unit that controls an operating condition of an internal combustion engine of a vehicle equipped with the internal combustion engine and a temperature sensor that detects temperature information of the internal combustion engine, by using a temperature of the internal combustion engine calculated based on the temperature information,
wherein the control unit controls the operating condition of the internal combustion engine based on a first temperature and a second temperature,
wherein the first temperature is calculated based on temperature information detected by a first temperature sensor element attached to the internal combustion engine so as to be exposed to a combustion chamber, via a recess that is depressed from an inner wall surface of a wall defining the combustion chamber of the internal combustion engine, and opens to the inner wall surface, with the first temperature sensor being accommodated in a case of the temperature sensor, as a structural element of the temperature sensor,
and wherein the second temperature is calculated based on temperature information detected by a second temperature sensor element disposed on a side of an outer wall surface of the wall than the first sensor element in a hole axial direction of a through hole penetrating the wall into which the case is inserted toward the recess, with the second temperature sensor being accommodated in the case to be shared by the first temperature sensor and the second temperature sensor, as a structural element of the temperature sensor.

2. The internal combustion engine control device according to claim 1, wherein the control unit controls the operating condition of the internal combustion engine based on the first temperature corresponding to a temperature of a first portion on a side of the combustion chamber in the wall and the second temperature corresponding to a temperature of a second portion on the side of the outer wall surface side than the first portion in the wall.

3. The internal combustion engine control device according to claim 2, wherein the control unit derives a value based on the first temperature and the second temperature, and sets a predetermined threshold based on torque of the internal combustion engine, to control the operating condition of the internal combustion engine based on the value and the predetermined threshold.

4. The internal combustion engine control device according to claim 3, wherein the value is a difference or a ratio between the first temperature and the second temperature.

5. The internal combustion engine control device according to claim 3, wherein the control unit executes control to advance or retard a timing of ignition of the internal combustion engine according to a magnitude relation between the value and the predetermined threshold, and the predetermined threshold is a threshold corresponding to a knocking level of the internal combustion engine.

6. The internal combustion engine control device according to claim 2, wherein the control unit derives a value based on the first temperature and the second temperature, and sets a predetermined threshold corresponding to a timing of the ignition at which torque of the internal combustion engine becomes maximum, to control the operating condition of the internal combustion engine based on the value and the predetermined threshold.

7. The internal combustion engine control device according to claim 6, wherein the value is a difference or a ratio between the first temperature and the second temperature.

8. The internal combustion engine control device according to claim 6, wherein the control unit executes control to advance or retard a timing of ignition of the internal combustion engine according to a magnitude relation between the value and the predetermined threshold.

9. The internal combustion engine control device according to claim 2, wherein the control unit derives a value based on the first temperature and the second temperature, and sets a predetermined threshold corresponding to a predetermined mass combustion crank angle of the internal combustion engine, to control the operating condition of the internal combustion engine based on the value and the predetermined threshold.

10. The internal combustion engine control device according to claim 9, wherein the value is a difference or a ratio between the first temperature and the second temperature.

11. The internal combustion engine control device according to claim 9, wherein the control unit executes control to advance or retard a timing of ignition of the internal combustion engine according to a magnitude relation between the value and the predetermined threshold.

12. The internal combustion engine control device according to claim 2, wherein the control unit controls the operating condition of the internal combustion engine based on the first temperature and the second temperature, and the first temperature is detected by the first temperature sensor element of the temperature sensor attached to an attachment portion of the internal combustion engine on a side of an intake valve, as a temperature of the wall on the side of the intake valve of the internal combustion engine.

13. The internal combustion engine control device according to claim 2, wherein the control unit controls the operating condition of the internal combustion engine based on a difference between the first temperature, corresponding to a wall surface temperature of the combustion chamber of the internal combustion engine, and the second temperature corresponding to a representative temperature of the internal combustion engine.

14. The internal combustion engine control device according to claim 13, wherein the control unit controls a timing of the ignition of the air-fuel mixture based on the difference between the first temperature and the second temperature, to control the operating condition of the internal combustion engine.

15. The internal combustion engine control device according to claim 13, wherein the control unit controls to advance or retard the timing of the ignition according to a magnitude relation between the difference between the first temperature and the second temperature and a predetermined threshold, and the predetermined threshold is set to include a first threshold corresponding to a knocking level of the internal combustion engine.

16. The internal combustion engine control device according to claim 15, wherein the predetermined threshold is set to further include a second threshold corresponding to the timing of the ignition at which torque of the internal combustion engine becomes maximum.

17. The internal combustion engine control device according to claim 16, wherein the predetermined threshold is set to further include a third threshold corresponding to a predetermined mass combustion crank angle of the internal combustion engine.

* * * * *